US008781101B2

(12) United States Patent
Kawashima et al.

(10) Patent No.: US 8,781,101 B2
(45) Date of Patent: Jul. 15, 2014

(54) OPERATOR MANAGEMENT APPARATUS AND METHOD

(71) Applicant: Fujitsu Limited, Kawasaki (JP)

(72) Inventors: Naoto Kawashima, Yokohama (JP); Naoto Matsudaira, Yokohama (JP); Yuusuke Tounai, Nishi (JP); Hiroshi Yoshida, Yokohama (JP); Shingo Hirono, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/018,208

(22) Filed: Sep. 4, 2013

(65) Prior Publication Data

US 2014/0010361 A1    Jan. 9, 2014

Related U.S. Application Data

(63) Continuation of application No. PCT/JP2011/056389, filed on Mar. 17, 2011.

(51) Int. Cl.
*H04M 3/00*      (2006.01)
*H04M 5/00*      (2006.01)

(52) U.S. Cl.
USPC ............ 379/265.06; 379/265.07; 379/265.08; 379/265.03; 379/265.05; 379/265.12

(58) Field of Classification Search
USPC ............. 379/265.01, 265.06, 265.08, 265.07, 379/265.09, 265.11, 265.12, 265.05, 265.03
See application file for complete search history.

(56) References Cited

U.S. PATENT DOCUMENTS

2011/0225293 A1*   9/2011   Rathod ........................ 709/224

FOREIGN PATENT DOCUMENTS

| EP | 1075130 A2 | 2/2001 |
|---|---|---|
| JP | 2001-77922 | 3/2001 |
| JP | 2003-244328 | 8/2003 |
| JP | 2004-110497 | 4/2004 |
| JP | 2007-228273 | 9/2007 |
| JP | 2010-239353 | 10/2010 |

OTHER PUBLICATIONS

International Search Report mailed Apr. 12, 2011 in corresponding International Application No. PCT/JP2011/056389.
Patent Abstracts of Japan, Publication No. 2001-077922, Published Mar. 23, 2001.
Patent Abstracts of Japan, Publication No. 2003-244328, Published Aug. 29, 2003.
Patent Abstracts of Japan, Publication No. 2004-110497, Published Apr. 8, 2004.
Patent Abstracts of Japan, Publication No. 2007-228273, Published Sep. 6, 2007.
Patent Abstracts of Japan, Publication No. 2010-239353, Published Oct. 21, 2010.

* cited by examiner

*Primary Examiner* — Thjuan K Addy
(74) *Attorney, Agent, or Firm* — Staas & Halsey LLP

(57) ABSTRACT

An operator management apparatus, includes a browsing times history storage unit configured to record a number of transmission times browsing information relating to a customer service is transmitted to an operator terminal used by an operator in association with an identifier of the operator that serves customers, for each of a plurality of operators, a load degrees storage unit configured to store load degrees of an operator in association with a number of transmission times of browsing information, a determining unit configured to specify a number of transmission times corresponding to a specific one of the identifies of the operators by referring to the browsing times history storage unit, and specify load degrees corresponding to the specified number of transmission times by referring to the load degrees storage unit, and an output unit configured to output the specified load degrees.

15 Claims, 25 Drawing Sheets

FIG.8

| RECEIVED NUMBER | QUERY TYPE |
|---|---|
| 0120-111-111 | ATYPICAL |
| 0120-111-112 | TYPICAL |

| OPERATOR ID | NAME | STATUS | QUERY TYPE | SKILL LEVEL |
|---|---|---|---|---|
| 1007 | TARO FUJI | ENGAGED | ATYPICAL | 3 |
| 1008 | SABURO SUZUKI | ENGAGED | ATYPICAL | 4 |
| 1009 | SATOMI YAMADA | STAND-BY | ATYPICAL | 3 |
| 2001 | KENTA SASAKI | ENGAGED | ATYPICAL | 5 |
| 2010 | MIYUKI SATO | ENGAGED | TYPICAL | 1 |
| 2011 | GORO TANAKA | STAND-BY | ATYPICAL | 5 |
| 2022 | KEIKO ADACHI | ENGAGED | TYPICAL | 5 |
| 2030 | KEN INOUE | STAND-BY | ATYPICAL | 4 |
| 2033 | JIRO UEDA | ENGAGED | ATYPICAL | 1 |
| 3000 | AKEMI SUZUKI | ENGAGED | TYPICAL | 2 |

| CUSTOMER ID | NAME | ADDRESS | PHONE NUMBER | PURCHASED PRODUCT MODEL NUMBER | PURCHASED SHOP |
|---|---|---|---|---|---|
| 986569 | HANAKO SUZUKI | TAMA-KU, KAWASAKI-SHI, KANAGAWA-KEN・・・・ | 090-1234-5678 | VS78359 | TAMA SHOP |
| 8645525 | JIRO FUJI | SHIBUYA-KU, TOKYO・・・・・ | 03-1111-2222 | GF0976 | SHIBUYA SHOP |
| 4237647 | TARO YAMADA | YOKOHAMA-SHI, KANAGAWA-KEN・・・・ | 045-111-222 | KJ98746 | YOKOHAMA SHOP |
| 376495 | SATO | NERIMA-KU, TOKYO・・・・・・ | 03-9999-0000 | KK076554 | NERIMA SHOP |

| CALL ID | CALL RECEIVED TIME | CUSTOMER ID | OPERATOR ID | ANSWERING-SERVICE MEMO | NUMBER OF INPUT CHARACTERS | NUMBER OF FAQ BROWSING TIMES | OPERATOR'S SPEAKING TIME | OPERATOR'S AUDIO FILE NAME |
|---|---|---|---|---|---|---|---|---|
| 0001 | 2010/8/31 10:23 | 986569 | 2000 | THE QUERY IS ABOUT POWER SUPPLY TO IRON VS SERIES. THE POWER WILL NOT BE TURNED ON. | 36 | 1 | 2000 | 1008011023200.av |
| 0002 | 2010/8/31 16:34 | 8645525 | 2010 | BRIGHT SPOTS WERE OBSERVED ON GF SERIES TV LCD SCREEN. THEY WERE ADJUSTED LAST OCTOBER, BUT THE PROBLEM IS STILL UNSOLVED. IN ADDITION, THERE ARE SOME TROUBLE WITH THE REMOTE CONTROLLER. A PARTICULAR CHANNEL DOES NOT WORK. THE BATTERY IS BRAND NEW. | 75 | 5 | 2010 | 1009011634201.av |
| 0003 | 2010/8/31 17:32 | 4237647 | 1009, 2001 | THE REMOTE CONTROLLER OF THE AIR-CONDITIONER KJ SERIES DOES NOT WORK. A BATTERY WAS CHANGED, BUT IT WAS NO USE. | 32 | 1 | 1009, 2001 | 1009031732100.av |
| 0004 | 2010/8/31 12:34 | 376495 | 3000 | OF THE MICROWAVE OVEN KK SERIES, THE WARM BUTTON DOES NOT START. | 26 | 0 | 3000 | 1009031234300.av |

| OPERATOR | | CLIENT | |
|---|---|---|---|
| SPEAKING START TIME | SPEAKING END TIME | SPEAKING START TIME | SPEAKING END TIME |
| 10:00:00 | 10:00:17 | 10:00:17 | 10:00:19 |
| 10:00:21 | 10:00:28 | 10:00:27 | 10:00:30 |
| 10:00:31 | 10:00:35 | 10:00:44 | 10:00:47 |
| 10:00:35 | 10:00:44 | 10:00:58 | 10:01:01 |
| 10:00:48 | 10:01:00 | 10:01:13 | 10:01:15 |
| 10:01:03 | 10:01:18 | 10:01:34 | 10:01:36 |
| 10:01:19 | 10:01:25 | 10:01:43 | 10:01:46 |
| 10:01:25 | 10:01:35 | 10:01:50 | 10:01:53 |
| 10:01:38 | 10:01:44 | 10:02:08 | 10:02:11 |
| 10:01:46 | 10:01:50 | | |
| 10:01:55 | 10:02:08 | | |
| 10:02:10 | 10:02:14 | | |

| PRODUCT CATEGORY | SERIES | QUERY GENRE | RESPONSE | NUMBER OF BROWSING TIMES |
|---|---|---|---|---|
| IRON | VS | POWER-SUPPLY SERIES | WHEN POWER IS NOT SWITCHED ON... | 25 |
| IRON | VT | OPERATION SERIES | WHEN A SWITCH IS NOT TURNED ON... | 51 |
| IRON | VT | OPERATION SERIES | WHEN IRON DOES NOT WORK DESPITE THE FACT THAT THE CLIENT HAS LEARNED ABOUT THE SWITCH... | 21 |
| IRON | VU | POWER-SUPPLY SERIES | IMMEDIATELY AFTER THE CONNECTION IS SWITCHED INTO WIRELESS, POWER... | 3 |

| 146 |
|---|
| NUMBER-OF-BROWSING TIMES THRESHOLD |
| 30 |

FIG.21

| SPEAKING | | | | ANSWERING-SERVICE MEMO INPUT | | | | FAQ BROWSING | | | |
|---|---|---|---|---|---|---|---|---|---|---|---|
| SPEAKING TIME (m) | SPEAKING LOAD DEGREES (FOR EACH SKILL LEVEL) | | | NUMBER-OF-INPUT CHARACTERS | INPUT LOAD DEGREES (FOR EACH SKILL LEVEL) | | | NUMBER-OF-FAQ BROWSING TIMES | FAQ BROWSING LOAD DEGREES (FOR EACH SKILL LEVEL) | | |
| | 1 | 2 | 3 | | 1 | 2 | 3 | | 1 | 2 | 3 |
| 0-10 | 0 | 0 | 0 | 0-20 | 1 | 0 | 0 | | 1 | 0 | 0 |
| 11-30 | 1 | 0 | 0 | 21-40 | 2 | 1 | 0 | 2 | 1 | 0 | 0 |
| 31-45 | 2 | 1 | 1 | 41-60 | 3 | 2 | 1 | 3 | 2 | 1 | 1 |
| 46-60 | 3 | 2 | 1 | 61-80 | 4 | 3 | 2 | 4 | 3 | 2 | 1 |
| 61-80 | 5 | 3 | 2 | 81-100 | 5 | 4 | 3 | 5 | 4 | 3 | 2 |
| 81-100 | 8 | 4 | 3 | 100-120 | 6 | 5 | 4 | 6 | 5 | 4 | 3 |
| EXCEEDING 101 | 12 | 8 | 5 | EXCEEDING 121 | 7 | 6 | 6 | 7 | 6 | 5 | 4 |

| LOAD DEGREES THRESHOLD | ⌐148 |
|---|---|
| 80 | |

OPERATOR MANAGEMENT APPARATUS AND METHOD

CROSS-REFERENCE TO RELATED APPLICATIONS

This application is a continuation application of International Application PCT/JP2011/056389 filed on Mar. 17, 2011 and designated the U.S., the entire contents of which are incorporated herein by reference.

FIELD

The disclosures herein are generally related to an operator management apparatus and an operator management method.

BACKGROUND

The quality of answering service (i.e., answering the queries of the customers) provided by the operator in the call center may depend not only on the capability of the operator but also on the degree of fatigue of the operator. In this respect, it is desirable to make the loads on the individual operators as equal as possible.

Typically, an attempt has been made to measure load degrees on each of the operators by the speaking communication duration (i.e., answering duration) (e.g., Patent Document 1).

However, the subjective load on those operators who frequently receive queries to which typical answers may be made such as queries about formalities or frequently asked queries that may be expected in advance appear to be relatively low despite the fact that a total speaking communication duration per day is long. On the other hand, the subjective load on those operators who frequently receive queries to which typical answers may be insufficient and a large number of documents need to be searched for or queries that may require a large amount of data entry to record the contents of the answering service appear to be relatively high despite the fact that a total speaking communication duration per day is short.

Hence, it may be difficult for the manager of the call center to accurately measure the load of the operators by simply monitoring their speaking communication duration.

RELATED ART DOCUMENTS

Patent Document

Patent Document 1: Japanese Laid-open Patent Publication No. 2001-77922

SUMMARY

According to an aspect of an embodiment, there is provided an operator management apparatus that includes a browsing times history storage unit configured to record a number of transmission times browsing information relating to a customer service is transmitted to an operator terminal used by an operator in association with an identifier of the operator that serves customers, for each of a plurality of operators, a load degrees storage unit configured to store load degrees of an operator in association with a number of transmission times of browsing information, a determining unit configured to specify a number of transmission times corresponding to a specific one of the identifies of the operators by referring to the browsing times history storage unit, and specify load degrees corresponding to the specified number of transmission times by referring to the load degrees storage unit, and an output unit configured to output the specified load degrees.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

Other objects, features, and advantages of the present invention will become more apparent from the following detailed description when read in conjunction with the accompanying drawings.

BRIEF DESCRIPTION OF DRAWINGS

FIG. 8 is a diagram illustrating a configuration example of a number-specific storage part;

FIG. 9 is a diagram illustrating a configuration example of an operator information storage part;

FIG. 10 is a diagram illustrating a configuration example of a customer information storage part;

FIG. 11 is a diagram illustrating a configuration example of an answering service history storage part;

FIG. 14 is a diagram illustrating a configuration example of a speaking history storage part;

FIG. 18 is a diagram illustrating a configuration example of an FAQ information storage part;

FIG. 19 is a diagram illustrating a configuration example of a number-of-browsing times threshold storage part;

FIG. 21 is a diagram illustrating a configuration example of a load degrees storage part;

FIG. 22 is a diagram illustrating a configuration example of a load degrees threshold storage part;

DESCRIPTION OF EMBODIMENTS

It may be desirable to provide an operator management apparatus, an operator management method, and a non-transitory computer-recordable recording medium storing a operator management program capable of assist recognition of load degrees imposed on operators in a call center.

Figure 1:
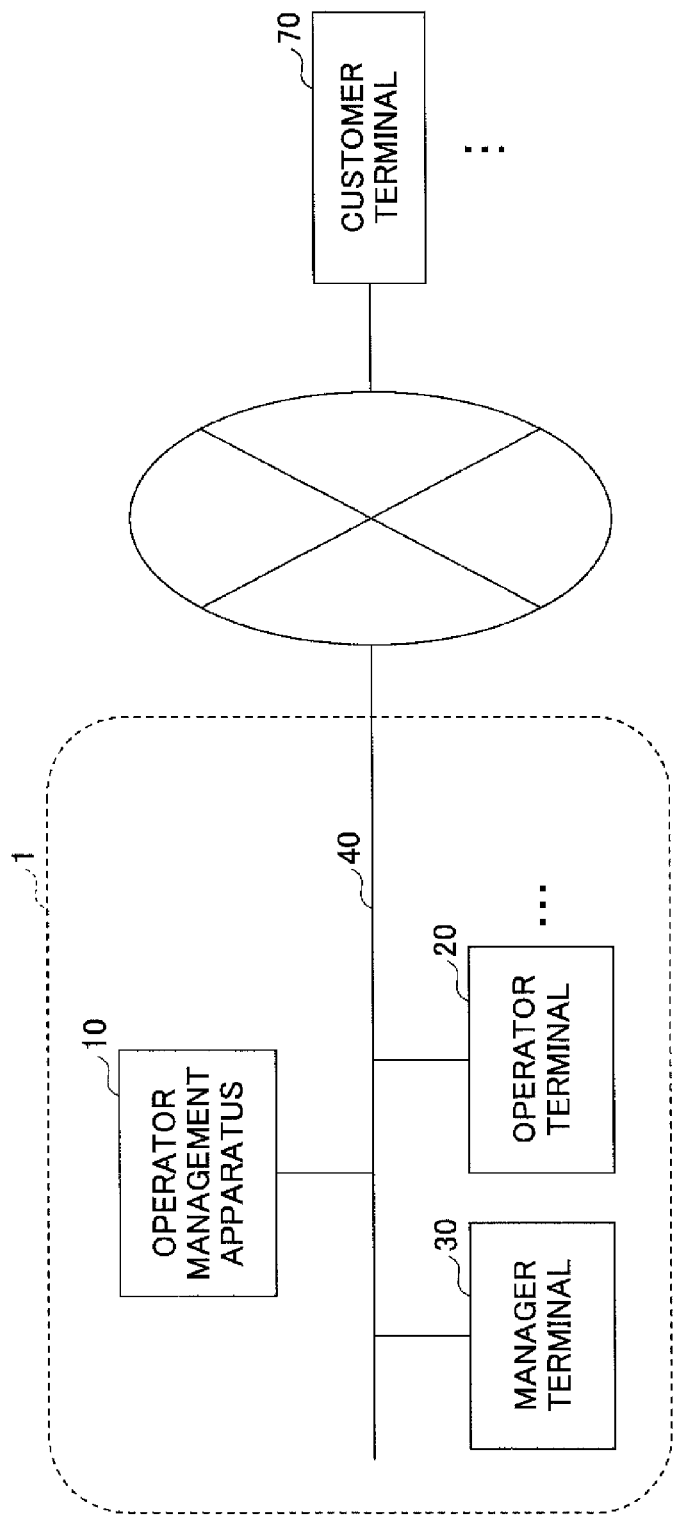
FIG. 1 is a diagram illustrating a configuration example of a call center assistant system in an embodiment.

Preferred embodiments of the present invention will be described with reference to the accompanying drawings. FIG. 1 is a diagram illustrating a configuration example of a call center assistant system in an embodiment. The call center assistant system 1 in FIG. 1 is a computer system for assisting a call center job. The call center assistant system 1 includes an operator management apparatus 10, plural operator terminals 20, and a manager terminal 30.

The operator management apparatus 10 is a computer serving as an automatic call distributor. The operator management apparatus 10 may, for example, automatically distribute phone calls received from external telephones (see a customer terminal 70 in FIG. 1) outside the call center to the operator terminals 20. In this embodiment, the operator management apparatus 10 is configured to distribute phone calls to respective operators (responsible operators) to equally distribute load degrees to the operators. The load in this respect specifically indicates a subjective load felt by each of the operators themselves. Note that the customer terminal 70 is not limited to a specific apparatus such as a fixed-line phone or a mobile phone insofar as the apparatus include a speaking communication function.

The operator terminal 20 is a computer used by the operator who receives phone calls from the customers and answers the queries of the customers. The operator terminal 20 may be connected with a headset and include a speaking communication function.

The manager terminal 30 is a computer used by a manager of the call center, generally called "supervisor". In this embodiment, the manager terminal 30 includes a function for allowing the manager to grasp the load degrees of each of the operators.

Note that the operator management apparatus 10, the manager terminal 30, and the operator terminal 20 are mutually communicable via a network 40 such as a local area network (LAN) regardless of wired or wireless connection. The phone calls received by the operator management apparatus 10 are converted into digital signals outside the operator management apparatus 10. The speaking communication associated with the phone calls distributed to each of the operators 20 is transmitted inside the call center assistant system 1 via the network 40.

Figure 2:
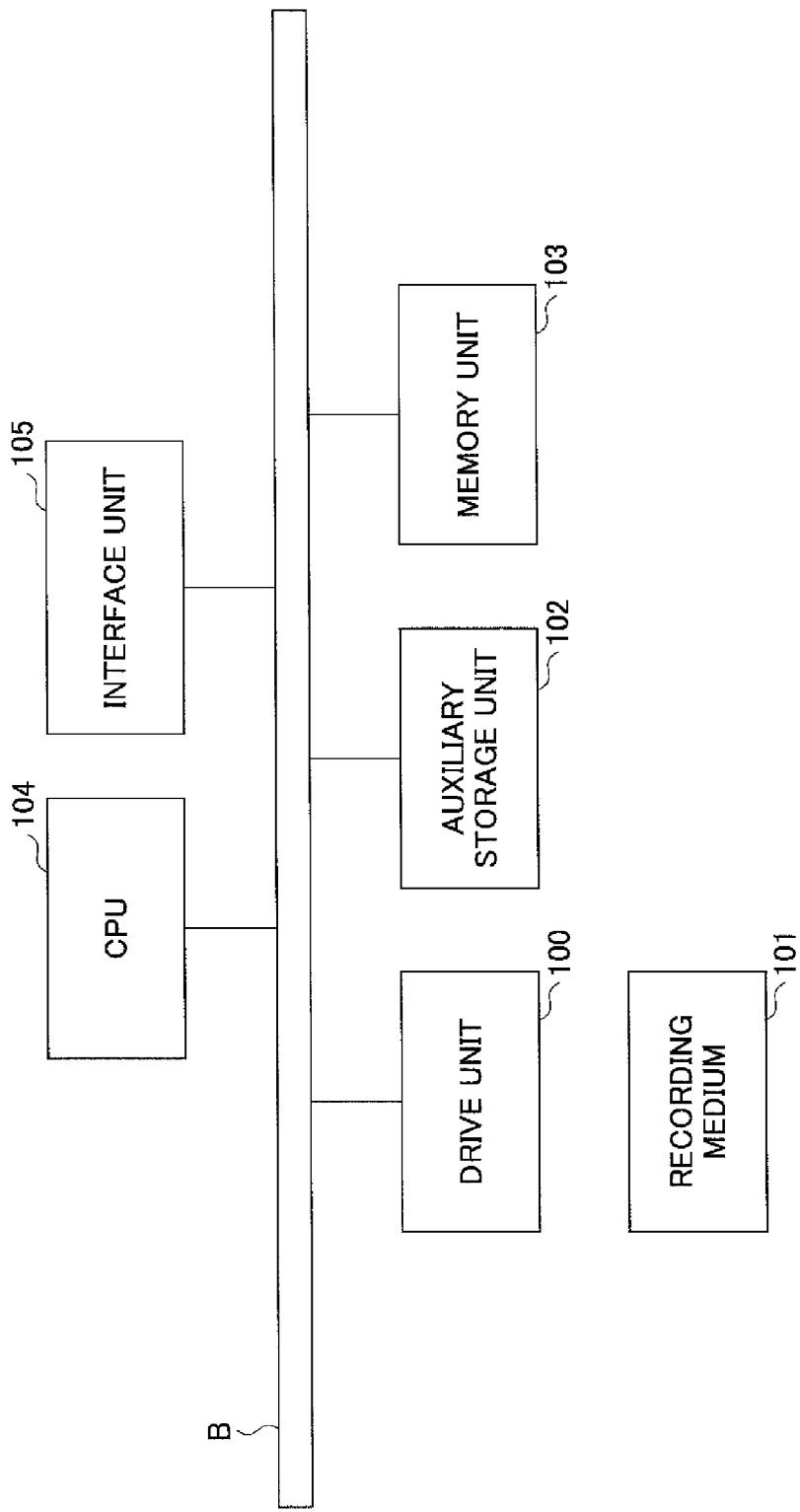
FIG. 2 is a diagram illustrating a hardware configuration example of an operator management apparatus in an embodiment.

FIG. 2 is a diagram illustrating a hardware configuration example of an operator management apparatus of an embodiment. The operator management apparatus 10 illustrated in FIG. 2 includes a drive unit 100, an auxiliary storage unit 102, a memory unit 103, a central processing unit (CPU) 104, and an interface unit 105, which are connected to one another via a bus B.

Programs implemented by the operator management apparatus 10 may be provided in a form of a recording medium 101. When the recording medium 101 storing the programs is set in the drive unit 100, the programs are installed in the auxiliary storage unit 102 via the drive unit 100. Note that the programs are not necessarily installed via the recording medium 101. The programs may be downloaded from another computer via a network. The auxiliary storage unit 102 is configured to store the installed programs, and necessary files or data.

The memory unit 103 is configured to retrieve a certain program from the auxiliary storage unit 102 and store the program when the operator management apparatus 10 receives an instruction to activate the program (i.e., a program activating instruction). The CPU 104 is configured to execute functions associated with the operator management apparatus 10 in compliance with the programs stored in the memory unit 103. The interface unit 105 is configured to serve as an interface for connecting the operator management apparatus 10 to the network.

Note that examples of the recording medium 101 include a compact disk read-only memory (CD-ROM), a digital versatile disk (DVD), or a universal serial bus (USB) memory. Further, examples of the auxiliary storage unit 102 include smart phones and a hard disk drive (HDD) or flash memory. Either of the recording medium 101 and the auxiliary storage unit 102 may serve as a non-transitory computer-readable recording medium.

Figure 3:
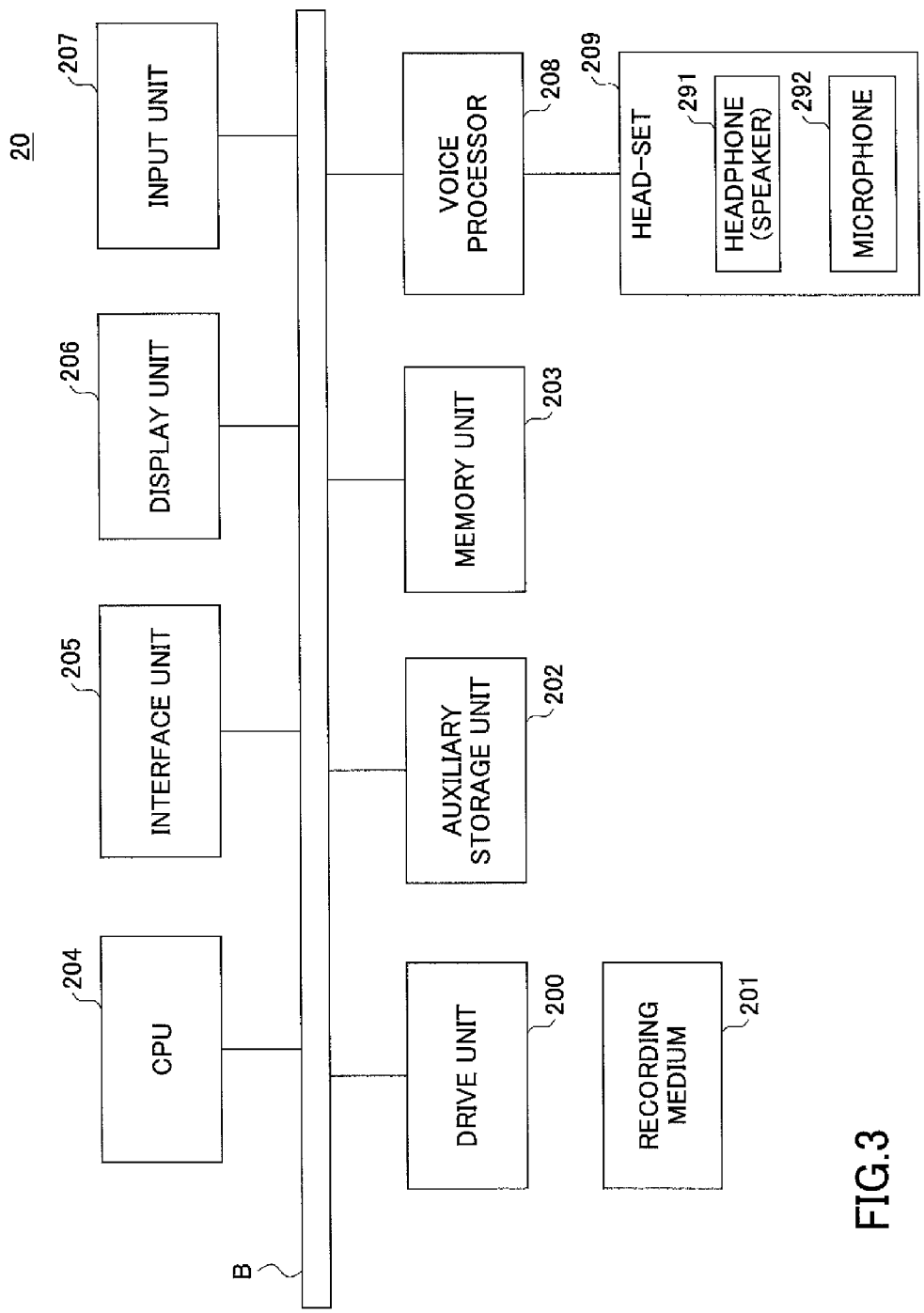
FIG. 3 is a diagram illustrating a hardware configuration example of an operator terminal in an embodiment.

FIG. 3 is a diagram illustrating a hardware configuration example of an operator terminal in an embodiment.

The operator terminal 20 illustrated in FIG. 3 includes a drive unit 200, an auxiliary storage unit 202, a memory unit 203, a central processing unit (CPU) 204, an interface unit 205, a display unit 206, an input unit 207, and a voice processor 208, which are connected to one another via a bus B, and a headset 209.

Programs implemented by the operator terminal 20 may be provided in a form of a recording medium 201. When the recording medium 201 storing the programs is set in the drive unit 200, the programs are installed in the auxiliary storage unit 202 via the drive unit 200. Note that the programs are not necessarily installed via the recording medium 201. The programs may be downloaded from another computer via the network. The auxiliary storage unit 202 is configured to store the installed programs, and necessary files or data.

The memory unit 203 is configured to retrieve a certain program from the auxiliary storage unit 202 and store the program when the operator terminal 20 receives an instruction to activate the program (i.e., a program activating instruction). A CPU 204 is configured to execute functions associated with the operator terminal 20 in compliance with the programs stored in the memory unit 203. The interface unit 205 is configured to serve as an interface for connecting the operator terminal 20 to the network. The display unit 206 is configured to display with a graphical user interface (GUI) implemented by the programs. The input unit 207 includes a keyboard, a mouse, and the like configured to input various types of instructions.

The voice processor 208 is configured to execute voice processing for operator's speaking communication. The headset 209 includes a headphone 291 configured to output voice of a communication partner and a microphone 292 configured to input operator's speaking (utterance).

Note that examples of the recording medium 201 are similar to those of the recording medium 101.

The manager terminal 30 may, for example, have a configuration similar to that of the operator terminal 20.

Figure 4:
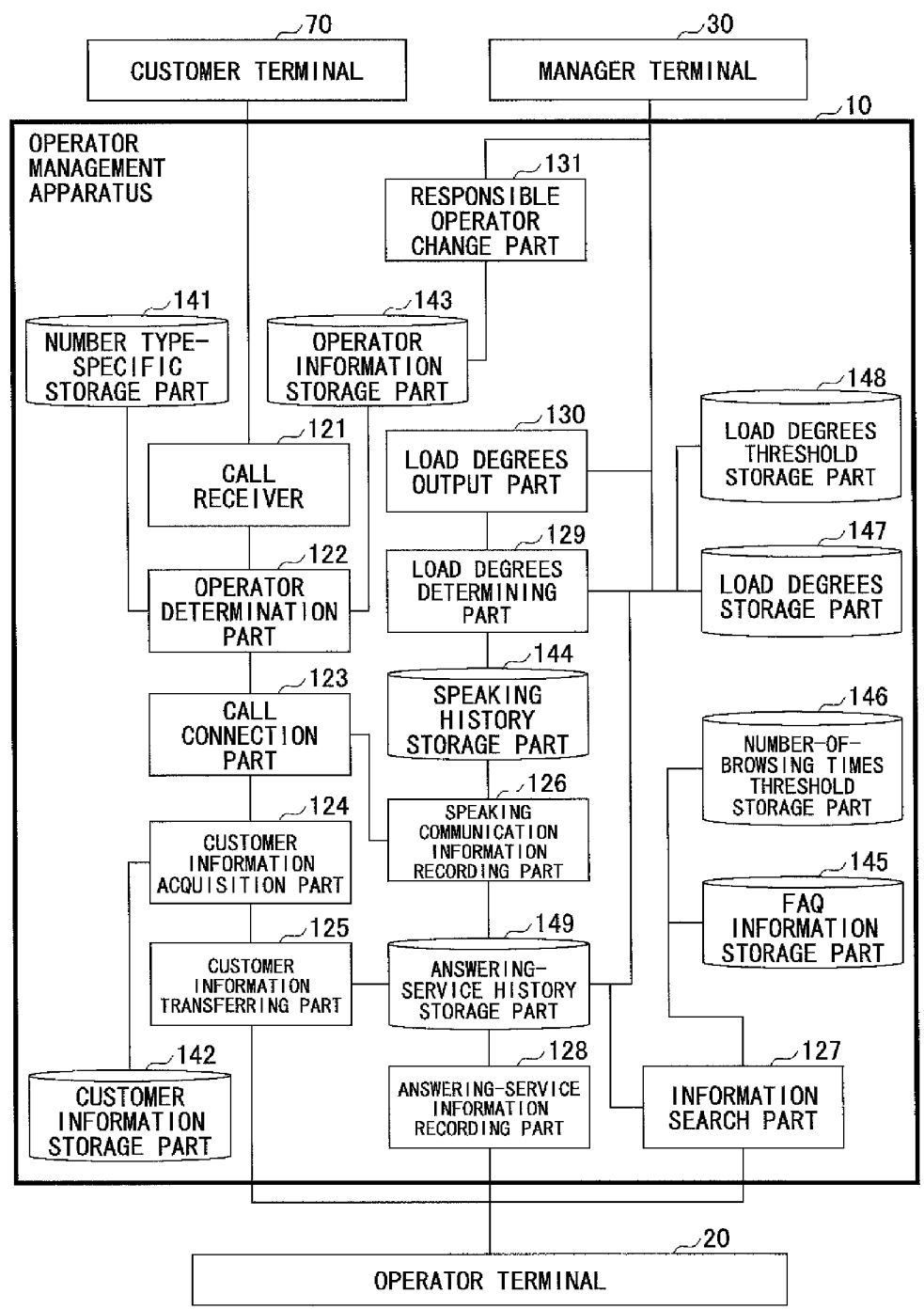
FIG. 4 is a diagram illustrating a functional configuration example of the operator management apparatus in the embodiment.

FIG. 4 is a diagram illustrating a functional configuration example of the operator management apparatus in the embodiment. In FIG. 4, the operator management apparatus 10 includes a call receiver 121, an operator determination part 122, a call connection part 123, a customer information acquisition part 124, a customer information transferring part 125, a speaking communication information recording part 126, an information search part 127, an answering-service information recording part 128, a load degrees determining part 129, a load degrees output part 130, and a responsible operator change part 131. The above components may be implemented by causing the CPU 104 to execute one or more programs installed on the operator management apparatus 10. Further, the operator management apparatus 10 includes a number type-specific storage part 141, a customer information storage part 142, an operator information storage part 143, a speaking history storage part 144, an FAQ information storage part 145, a number-of-browsing times threshold storage part 146, a load degrees storage part 147, a load degrees threshold storage part 148, and an answering-service history storage part 149. These storage parts may be implemented by utilizing the auxiliary storage unit 102. Alternatively, the storage parts may be implemented by utilizing a storage unit connected to the operator management apparatus 10 via the network.

The call receiver 121 is configured to receive phone calls from the outside of the call center assistant system 1 (i.e., a customer terminal 70 in this embodiment). The operator determination part 122 is configured to determine an operator responsible for the received call by referring to the number type-specific storage part 141, and the customer information storage part 142. The number type-specific storage part 141 is configured to store a type of the query (query type) for each of the received numbers. The operator information storage part 143 is configured to store attribute information of each of the operators. The attribute information includes an operator's status (whether the operator is engaged in answering-service or in a stand-by status).

The call connection part 123 is configured to connect a received call to the operator terminal 20 of the operator determined by the operator determination part 122. The customer information acquisition part 124 is configured to acquire attribute information (customer information) associated with the received call from the customer information storage part 142. The customer information transferring part 125 is configured to transfer the customer information acquired by the customer information acquisition part 124 to the image acquired by the image acquisition part 14.

The speaking communication information recording part 126 is configured to record audio data indicating the speaking communication content, and the respective speaking time histories of the operator and the customer. The speaking time histories are recorded in the speaking history storage part 144.

The information search part 127 is configured to acquire FAQ information that matches a condition specified in the FAQ information browsing request in response to the FAQ information browsing request (search request) from the operator terminal 20 used by the operator engaged in the answering-service. The information search part 127 is configured to return the acquired FAQ information to the operator terminal 20. Note that the FAQ information includes frequently asked questions (FAQs) and answers to those FAQs.

The answering-service information recording part 128 is configured to receive a string of characters (i.e., a later-described answering-service memo) associated with the answering service input by the operator from the operator terminal 20, and record the received string of characters in the answering-service history storage part 149. The answering-service history storage part 149 is configured to store each set of the answering-service history data.

The load degrees determining part 129 is configured to apply information stored by the answering-service history storage part 149 or the speaking history storage part 144 to information stored by the load degrees storage part 147, and to determine the load degrees of each of the operators. The load degrees are indices of the load levels (specifically, subjective load) imposed on the operator. The load degrees output part 130 is configured to output (transmit) the operator's load degrees determined by the load degrees determining part 129 to the manager terminal 30. The responsible operator change part 131 is configured to change a query type assigned to the operator who exhibits the high load.

Note that the number-of-browsing times threshold storage part 146 and the load degrees threshold storage part 148 will be described later.

Figure 5:
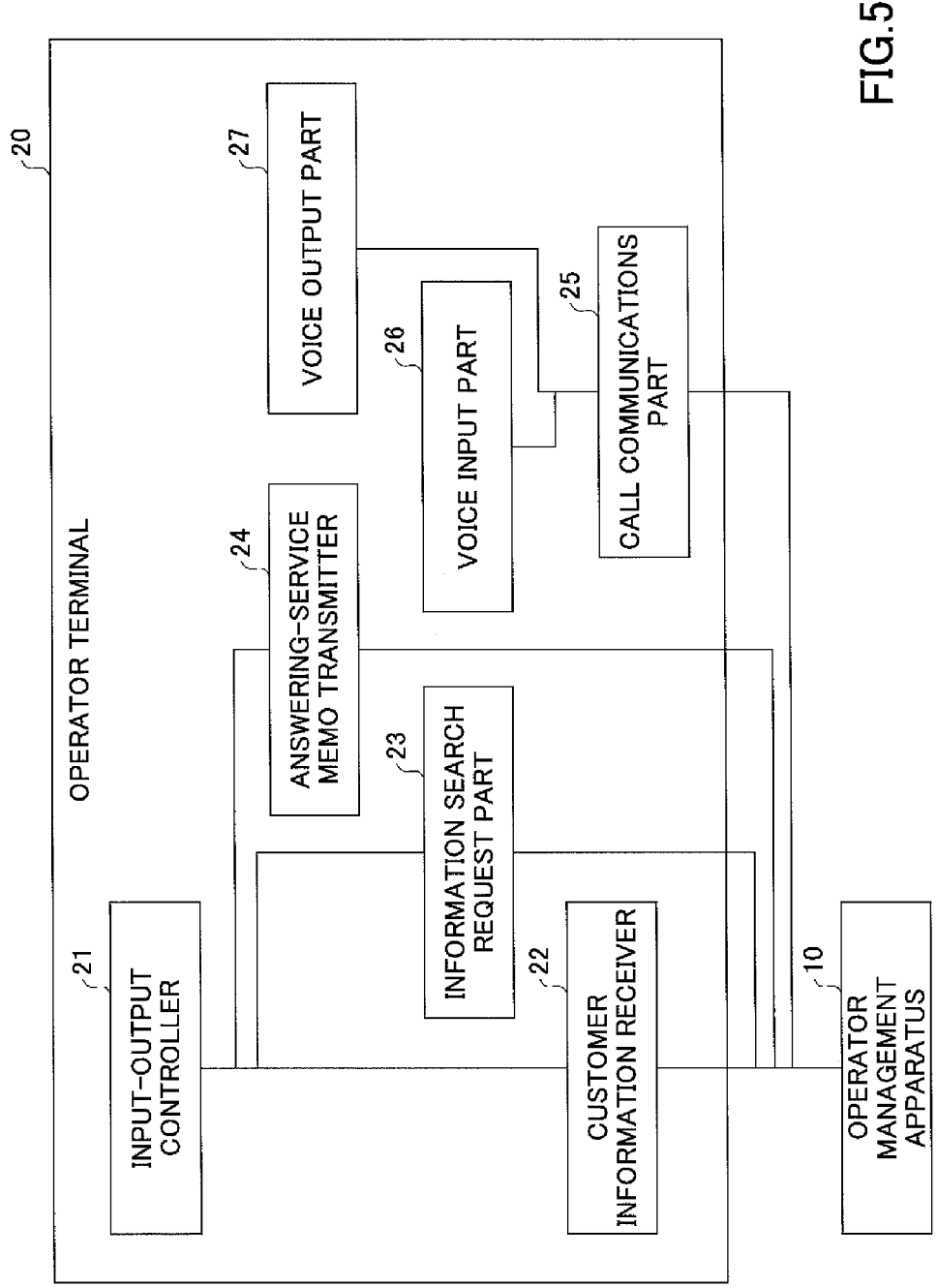
FIG. 5 is a diagram illustrating a functional configuration example of the operator terminal in the embodiment.

FIG. 5 is a diagram illustrating a functional configuration example of the operator terminal in the embodiment. As illustrated in FIG. 5, the operator terminal 20 includes an input-output controller 21, a customer information receiver 22, an information search request part 23, an answering-service memo transmitter 24, a call communications part 25, a voice input part 26, and a voice output part 27. These components may be implemented by causing the CPU 204 of the operator terminal 20 to execute one or more programs installed on the operator terminal 20.

The input-output controller 21 is configured to control a process in response to an input or output performed via a keyboard or a mouse, or a process of an output into the display unit. The customer information receiver 22 is configured to receive customer information transferred from the operator management apparatus 10. The information search request part 23 is configured to transmit a search request to search for information necessary for the operator engaged in the answering-service to provide an answer to the query of the customer. The answering-service memo transmitter 24 is configured to transmit the answering-service memo input by the operator who is currently engaged in the answering-service or finishes the answering service to the operator management apparatus 10. The call communications part 25 is configured to control communications associated with the calls. The voice input part 26 is configured to receive an input of the speech uttered by the operator. The voice output part 27 is configured to output the speech uttered by the customer.

Figure 6:
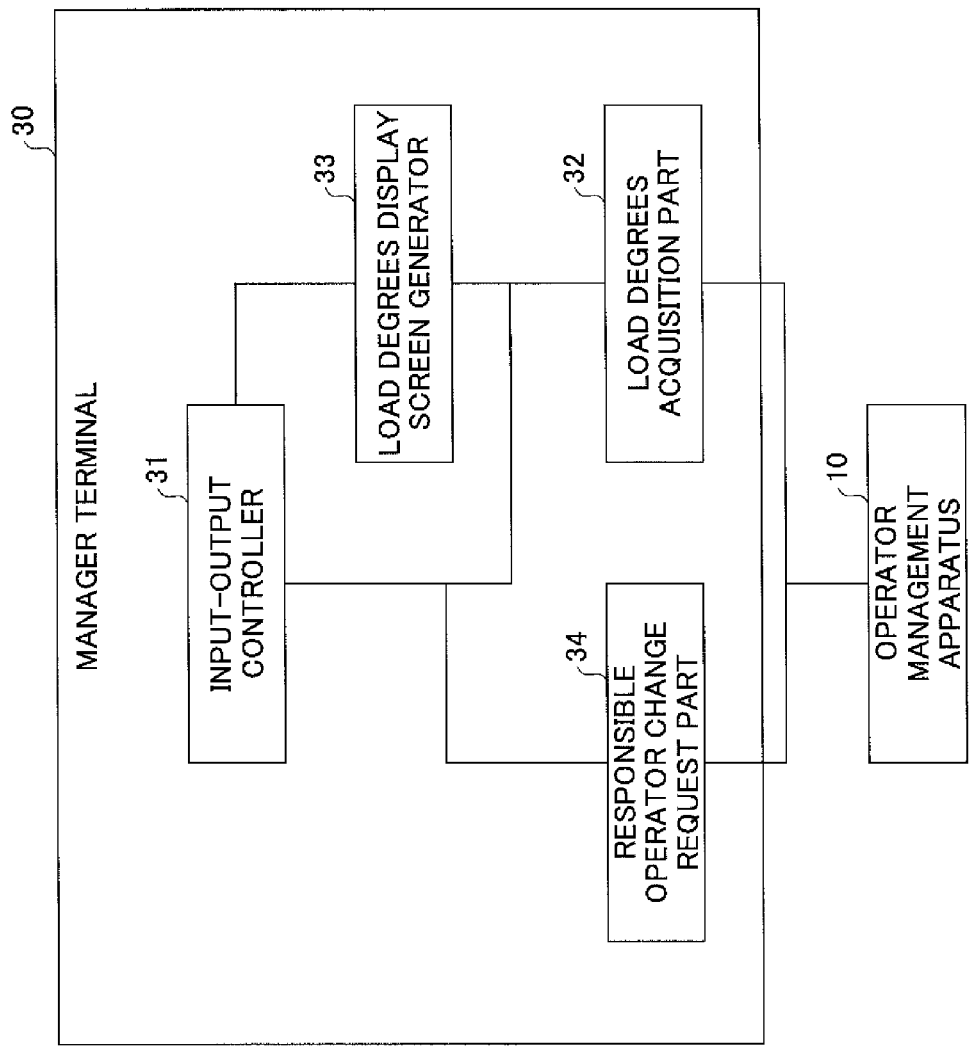
FIG. 6 is a diagram illustrating a functional configuration example of a manager terminal in an embodiment.

FIG. 6 is a diagram illustrating a functional configuration example of the manager terminal in the embodiment. As illustrated in FIG. 6, the manager terminal 30 includes an input-output controller 31, a load degrees acquisition part 32, a load degrees display screen generator 33, and a responsible operator change request part 34. These components may be implemented by causing a CPU of the manager terminal 30 to execute one or more programs installed on the manager terminal 30.

The input-output controller 31 is configured to control a process in response to an input or output performed via a keyboard or a mouse, or a process of an output into the display unit. The load degrees acquisition part 32 is configured to acquire the load degrees of each of the operators from the operator management apparatus 10. The load degrees display screen generator 33 is configured to generate a screen (a load degrees display screen) for displaying the load degrees of each of the operators. The responsible operator change request part 34 is configured to transmit a change request for changing a query type assigned to the operator to the operator management apparatus 10.

A description will be given below of a sequence of processes executed by the operator management terminal 10.

Figure 7:
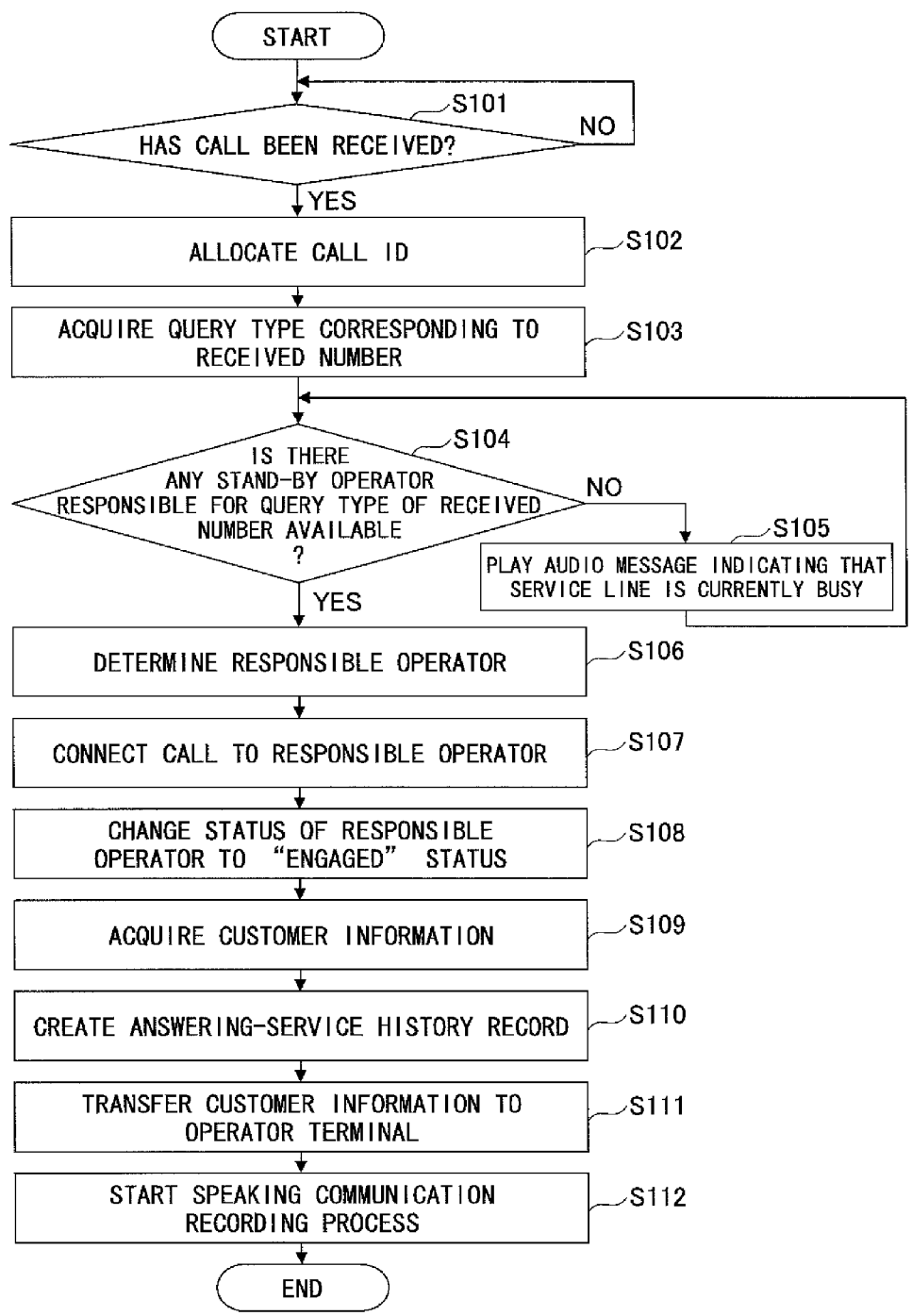
FIG. 7 is a flowchart illustrating an example of a sequence of processes executed by the operator management apparatus on receiving a call.

FIG. 7 is a flowchart illustrating an example of a sequence of processes executed by the operator management apparatus on receiving a call.

When the call receiver 121 receives a call transmitted by the customer terminal 70 ("YES" in step S101), the call receiver 121 assigns a call ID to the received call (step S102). The call ID is an identifier for uniquely identifying each of the calls (each of the speaking communications). Subsequently, the operator determination part 122 acquires the query type corresponding to the received number from the number type-specific storage part 141 (step S103).

FIG. 8 is a diagram illustrating a configuration example of a number type-specific storage part. As illustrated in FIG. 8, the number type-specific storage part 141 is configured to store a type of the query (query type) for each of the received numbers. Example of the query type include "typical" and "atypical" types. The "typical" type indicates the queries to which a typical answer such as various formalities and procedures may be applied. The "atypical" type indicates the queries to which the typical answer is not applied. Note that the above distinction is only an example, and the query types differing from the above example may also be applied insofar the load degrees of the operator may be discriminated from a different aspect. In this embodiment, the "atypical" query is defined as imposing higher load degrees on the operator than the "typical" query.

Note that the received numbers may be unified. In this case, the query type may be determined based in the input information corresponding to audio guidance after the phone call is received.

Subsequently, the operator determination part 122 refers to the operator information storage part 143 and determines whether there is any operator in the stand-by status (currently not engaged in the answering-service) in association with a type of the query (hereinafter also called a "target query type" acquired in step S103 (step S104).

FIG. 9 is a diagram illustrating a configuration example of an operator information storage part. The operator information storage part 143 is configured to store an operator ID, a name, a status, a query type, and a skill level for each of the operators.

The operator ID is an identifier for uniquely identifying each of the operators. The name is a name of the operator. The status is a current status of the operator. In FIG. 9, "engaged" and "stand-by" are illustrated as the status value of the operator. The "engaged" status indicates that the operator is engaged in the answering-service (i.e., currently in communication with the customer). The "stand-by" status indicates that the operator is currently in a stand-by mode. The "stand-by" status indicates that a call may be allocated to the operator.

The query type indicates a type of the query currently allocated to the operator. As described later, the allocation of the type of the query may be changed at any time based on the load degrees of each of the operators. The skill level is information representing the operator's capability in the five-level rating system. The five-level rating system of this embodiment indicates that the greater the numerical value is the higher the skill level will be. Note that in this embodiment, the evaluation system of the skill level is not limited to a predetermined system or scale. For example, the evaluation system of the skill level may be determined based on the length of the operator's service years or the evaluation made by the manager or the like.

In the step S104, the operator determination part 122 searches the operator information storage part 143 for operators who have a value of the query type matching the target query and are in the "stand-by" status.

When there is no operator who satisfies the above conditions ("NO" in step S104), the operator determination part 122 plays an audio message indicating, for example, that the answering-service line is currently busy until the operator determination part 122 finds the corresponding operator (step S105).

When the operator determination part 122 has found the corresponding operators ("YES" in step S104), the operator determination part 122 determines one of the found operators to be allocated to the currently received call as the operator in charge of the currently received call (hereinafter referred to as a "responsible operator") (step S106).

Subsequently, the call connection part 123 connects (or distributes) the call to the operator terminal 20 of the responsible operator (step S107). Subsequently, the call connection part 123 updates the value of the status of the operator with the "engaged" status in the operator information storage part 143 (step S108).

Subsequently, the customer information acquisition part 124 acquires customer information of a customer, the caller (hereinafter called a "client") from the customer information storage part 142 (step S109).

FIG. 10 is a diagram illustrating a configuration example of a customer information storage part. As illustrated in FIG. 10, the customer information storage part 142 is configured to store a customer ID, a name, an address, a phone number, a purchased product model number, and a purchased shop for each of the customers.

The customer ID is an identifier for uniquely identifying each of the customers. The name is the name of the customer, the address is an address of the customer, and the phone number is a phone number of the customer. The purchased product model number is a model number of the product purchased by the customer. The purchased shop is a name of the shop from which the customer purchased the product.

In the above step S109, the customer information acquisition part 124 acquires customer information including the phone number that matches the phone number associated with the call from the customer information storage part 142. Note that the customer information including the customer ID may be acquired by causing the customer to input his/her customer ID according to the audio guidance played in response to the reception of the call.

Subsequently, the customer information transferring part 125 creates a record corresponding to the received call in the answering-service history storage part 149 (step S110).

FIG. 11 is a diagram illustrating a configuration example of the answering-service history storage part. As illustrated in FIG. 11, the answering-service history storage part 149 is configured to store a call ID, call received date and time, a customer ID, an operator ID, an answering-service memo, the number of input characters, the number of FAQ browsing times, the operator's speaking time (operator's speaking duration), and an audio file name for each of the answering services (each of the calls or communications) provided by a corresponding responsible operator.

The call ID is a call ID associated with an answering service. The call received date and time are date and time when the call is received. The customer ID is a customer ID of the caller. The operator ID is an operator ID of the operator who is in charge of providing the answering-service associated with the received call. The answering-service memo indicates a string of characters (memo) input by the responsible operator while or after the operator provides the answering-service. Note that the answering-service memo is an example of data generated by the operator. The number of input characters is the number of characters in the answering-service memo. That is, the number of input characters indicates the amount of data generated by the operator. The number of FAQ browsing times indicates the number of times the operator has browsed FAQ information while serving the answering-service. The operator's speaking time indicates duration in which the operator speaks while providing the answering-service. The audio file name indicates a file name of the audio file having records of the communication content.

In the above step S110, the customer information transferring part 125 creates a new record in the answering-service history storage part 149, and records values of a call ID, call received date and time, a customer ID, and an operator ID corresponding to the newly created record. The call ID includes a call ID allocated to the currently received call. The call received date and time include date and time when the current call is received. The customer ID is a customer ID of the client (i.e., the caller). The operator ID is an operator ID of the responsible operator. The customer information transferring part 125 initializes the value of the number-of-FAQ browsing times of the corresponding record to "0".

Subsequently, the customer information transferring part 125 transfers the customer information of the client to the operator terminal 20 of the responsible operator (step S111).

Subsequently, the speaking communication information recording part 126 starts recording the speaking communication information (step S112).

Figure 12:
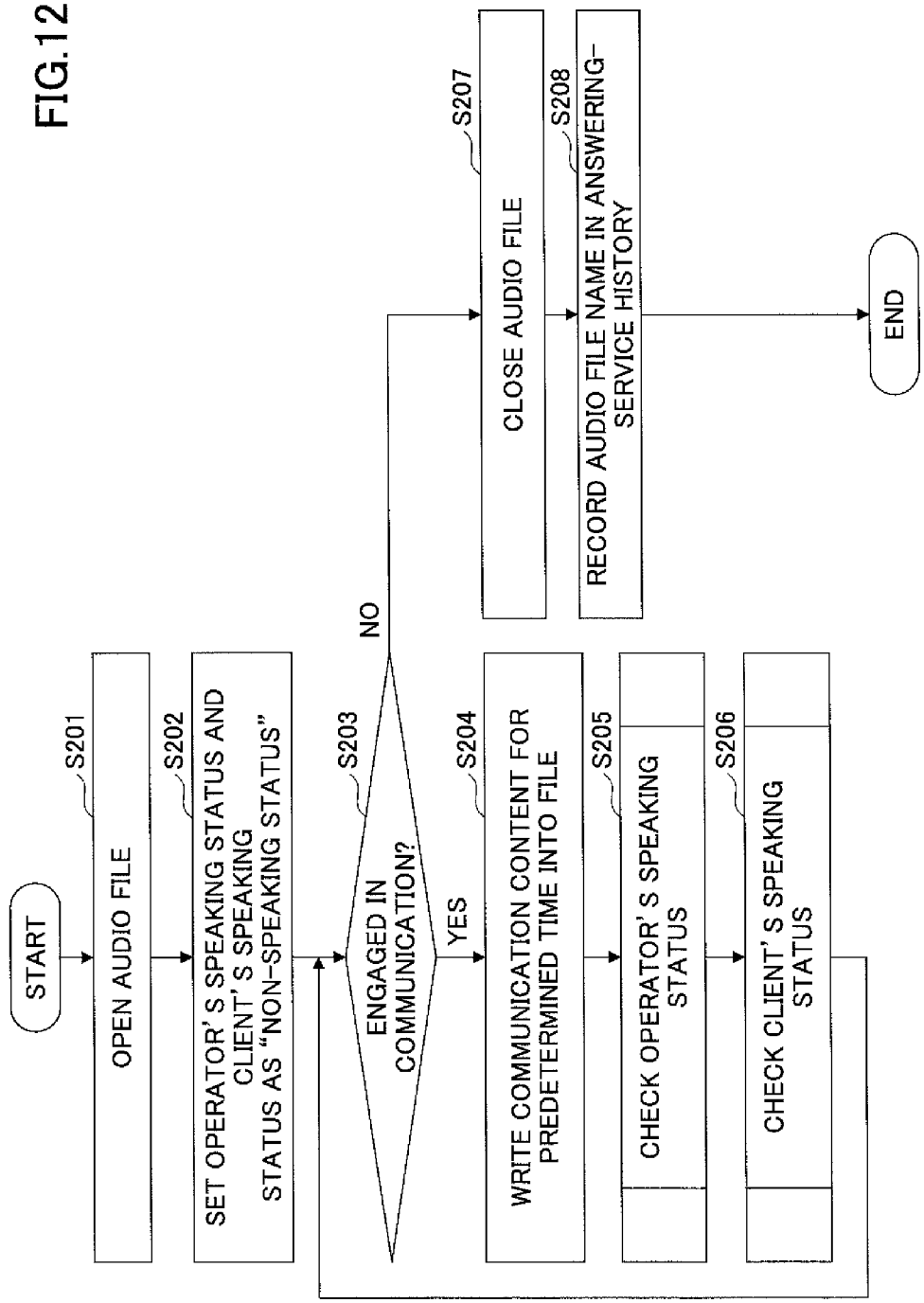
FIG. 12 is a flowchart illustrating an example of a speaking communication information recording process.

Next, a description is given of a process of recording the speaking communication information initiated in step S112. FIG. 12 is a flowchart illustrating an example of a speaking communication information recording process. The speaking communication information recording part 126 may, for example, be activated as a process for each of the calls. Each process includes a specific call ID (hereinafter called a "target call ID") corresponding to the call.

In step S201, the speaking communication information recording part 126 generates (opens) an audio file for recording the speaking communication content. The audio file may, for example, be generated in the auxiliary storage unit 102. Subsequently, the call connection part 126 sets values of the operator's speaking status and the client's speaking status as a "non-speaking" status (step S202). The operator's speaking status and the client's speaking status may, for example, be variables for recording the speaking statuses (i.e., whether the operator or the client is currently engaged in speaking) of the responsible operator or the client in the memory unit 103.

Subsequently, the speaking communication information recording part 126 repeats executing steps S204 to S206 while the operator is engaged in speaking (i.e., engaged in speaking communication) ("YES" in step S203).

In step S204, the speaking communication information recording part 126 records (writes) the speaking communication content for a predetermined time (e.g., 20 ms) in the audio file. Note that the speaking communication content indicates audio information including both the speaking content (voice) of the responsible operator and the speaking content (voice) of the client. However, the audio information is recorded in a stereo system in order to discriminate the speaking content (voice) of the responsible operator from the speaking content (voice) of the client.

Subsequently, the speaking communication information recording part 126 executes a process for checking the speaking status of the responsible operator (step S205). More specifically, a speaking start time and a speaking end time of the responsible operator are detected, and the operator's speaking time (duration) is recorded when the speaking end time is detected. Subsequently, the speaking communication information recording part 126 executes a process for checking the speaking status of the client (step S206). That is, the process similar to that in step S205 is executed in association with the speaking status of the client.

Note that steps S205 and 206 will instantaneously be processed. Hence, during speaking communication, steps S204 to S206 may be repeated with a period approximately the same as a predetermined time interval consumed in step S204.

When the speaking communication information recording part 126 detects the end of the speaking communication (disconnection of the call) ("NO" in step S203), the speaking communication information recording part 126 closes the audio file (step S207). Subsequently, the speaking communication information recording part 126 records a file name of the corresponding audio file in the audio file name of the record including the target call ID in the answering-service history storage part 149 (step S208). Thereafter, the process corresponding to the target call ID of the speaking communication information recording part 126 ends.

Figure 13:
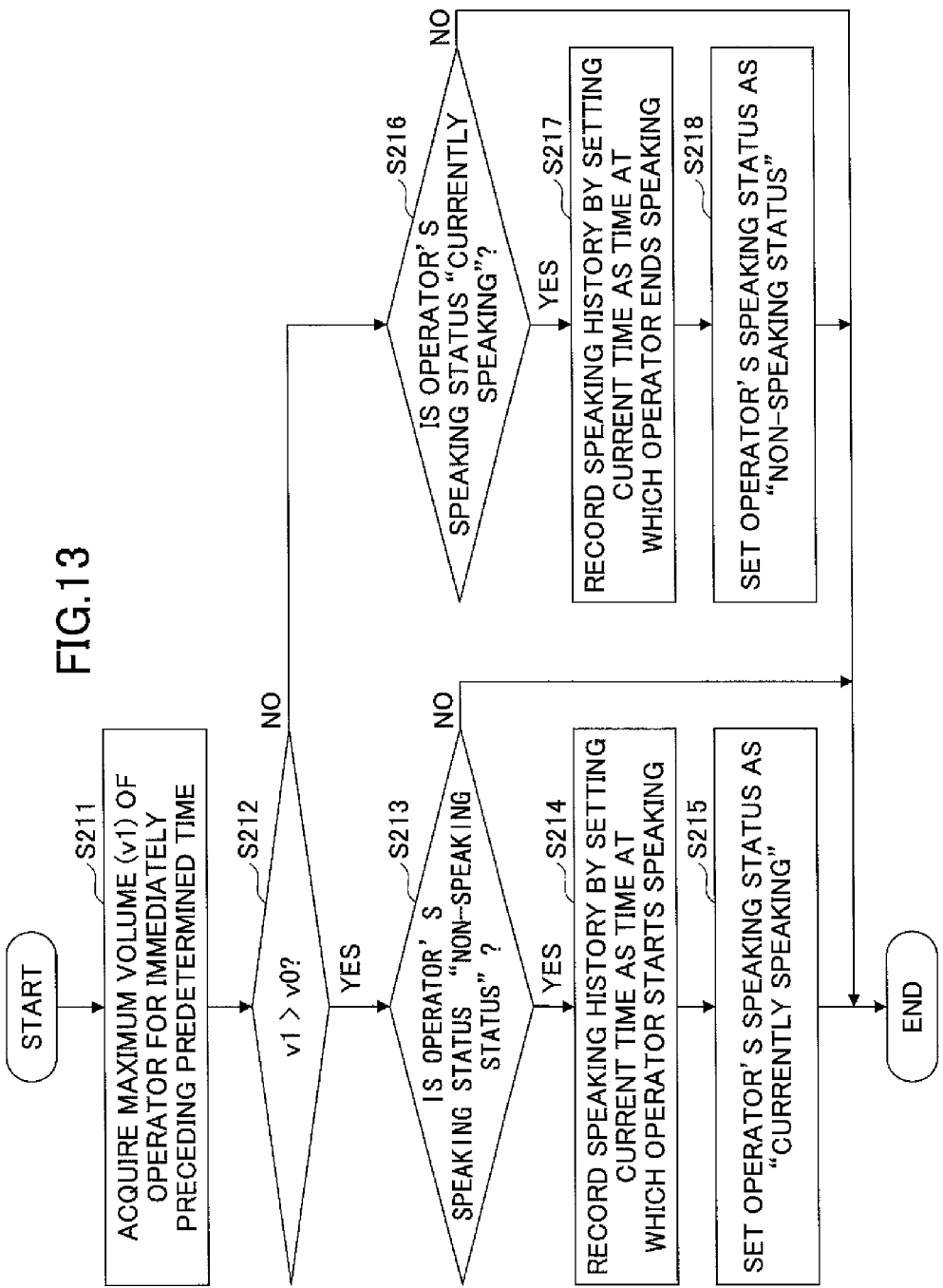
FIG. 13 is a flowchart illustrating an example of a process for checking an operator's speaking status.

Next, a detailed description will be given of a process in step S205. FIG. 13 is a flowchart illustrating an example of a process for checking an operator's speaking status.

In step S211, the speaking communication information recording part 126 acquires a maximum audio volume associated with the responsible operator in the immediately preceding predetermined time (a predetermined time in immediately preceding step S201). The maximum audio volume may be acquired by analyzing the audio file, or may be measured in the predetermined time in step S204 and stored in the memory unit 103.

Subsequently, the speaking communication information recording part 126 determines whether the maximum audio volume associated with the responsible operator is 0 in the immediately preceding predetermined time (step S212). That is, whether the operator has been speaking is determined. When the audio volume associated with the responsible operator exceeds 0 ("YES" in step S212), the speaking communication information recording part 126 determines whether the speaking status of the responsible operator is a "non-speaking" status (step S213). When the speaking status of the responsible operator is a "non-speaking" status ("YES" in step S213), the speaking communication information recording part 126 records a current time as a speaking start time of the responsible operator in the speaking history storage part 144 (step S214).

FIG. 14 is a diagram illustrating a configuration example of the speaking history storage part 144. As illustrated in FIG. 14, the speaking history storage part 144 records a speaking start time and a speaking end time for each of combinations of the operator and the client. The speaking start time indicates a start time at which the operator or the client starts speaking in one speaking interval (from start speaking to end speaking). The speaking end time indicates an end time at which the operator or the client ends speaking in one speaking. In general, there are conversational exchanges between the responsible operator and the client in one call (i.e., one speaking communication). Hence, the speaking history storage part 144 registers plural records for each of the operator and the client in association with one call. Note that a table illustrated in FIG. 14 is generated for each of the calls (for each of the call IDs).

In the above step S214, a new record associated with the operator's speaking is added to the speaking history storage part 144 corresponding to the target call ID, and a current time is recorded in the speaking start time of the corresponding record.

Subsequently, the speaking communication information recording part 126 updates the speaking status of the responsible operator with the "currently speaking" status (step S215).

On the other hand, when the audio volume associated with the responsible operator is 0 ("NO" in step S212), the speaking communication information recording part 126 determines whether the speaking status of the responsible operator is the "currently speaking" status (step S216). When the speaking status of the responsible operator is the "currently speaking" status ("YES" in step S216), the speaking communication information recording part 126 records a current time as a speaking end time of the responsible operator in the speaking history storage part 144 corresponding to the target call ID (step S217). That is, a current time is recorded in the speaking end time of the last record associated with the operator's speaking status in the speaking history storage part 144.

Subsequently, the speaking communication information recording part 126 updates the speaking status of the responsible operator with the "non-speaking" status (step S218).

Figure 15:
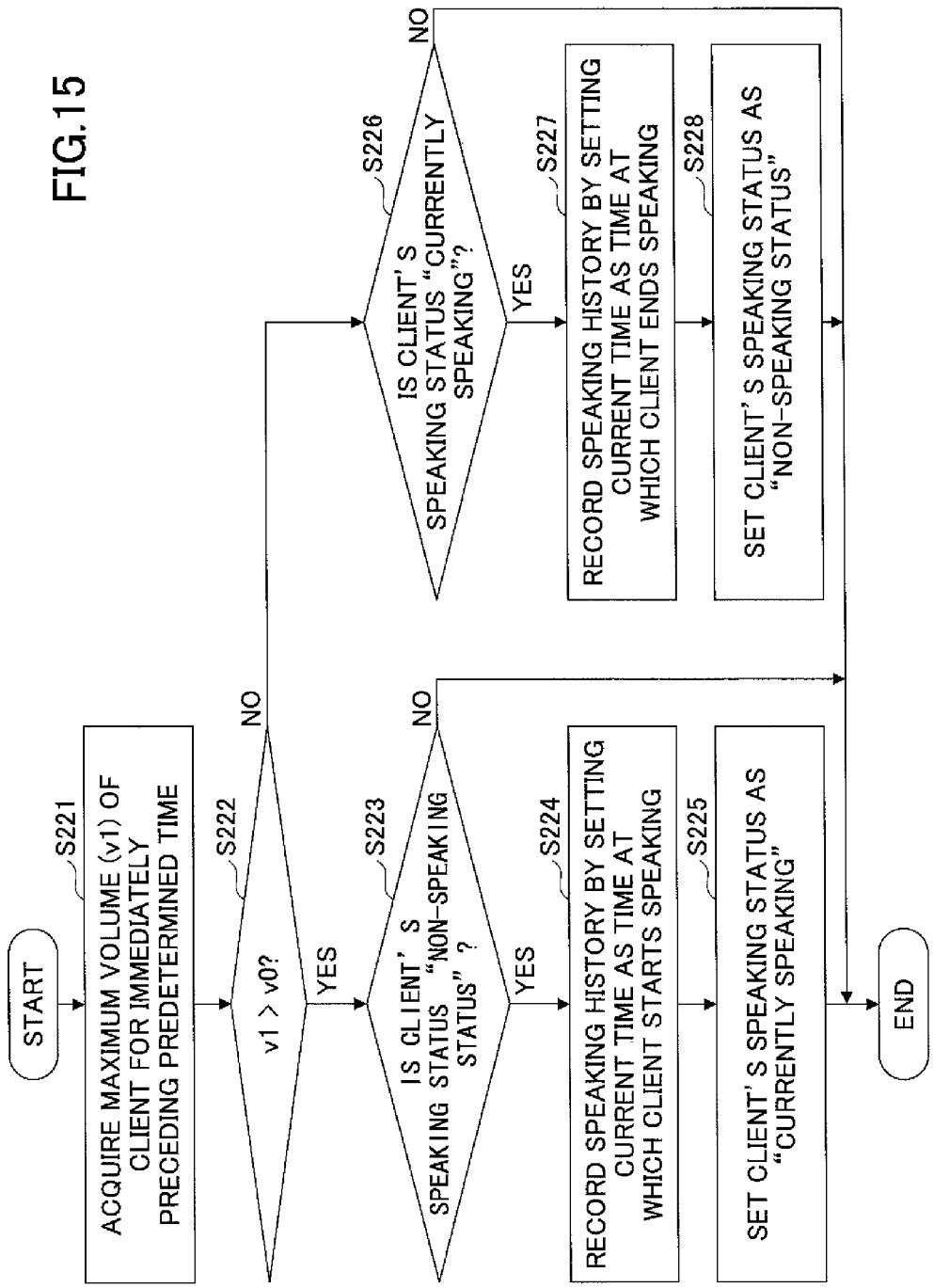
FIG. 15 is a flowchart illustrating an example of a process for checking a client's speaking status.

Subsequently, a detailed description will be given of step S206 illustrated in FIG. 12. FIG. 15 is a flowchart illustrating an example of a process for checking a client's speaking status. The process illustrated in FIG. 15 is similar to the process illustrated in FIG. 13 except that the "operator" is replaced with the "client". Since the description of FIG. 15 is obvious from the description of FIG. 13, the description of FIG. 15 is thus omitted from the specification.

The call communications part 25 of the operator terminal 20 of the responsible operator initiates communications associated with the call connected to the operator terminal 20 in response to the process of FIG. 7. As a result, the speaking (conversational) communication between the operator and the client in association with the corresponding call is initiated. Further, the customer information receiver 22 of the operator terminal 20 receives the customer information transferred from the customer information transferring part 125 of the operator management apparatus 10. The input-output controller 21 causes the display unit of the operator terminal 20 to display an answering-service screen including the customer information and the like.

Figure 16:
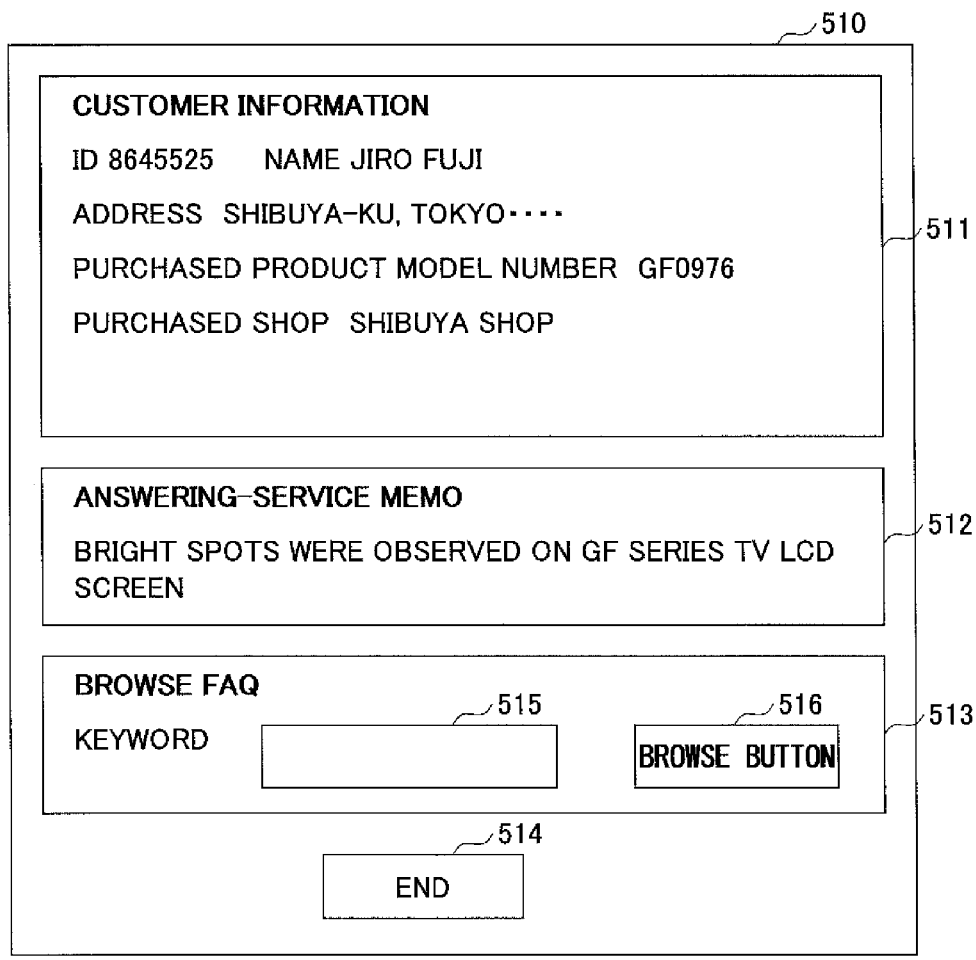
FIG. 16 is a diagram illustrating a display example of an answering service screen.

FIG. 16 is a diagram illustrating a display example of the answering-service screen. As illustrated in FIG. 16, the answering-service screen 510 includes a customer information display area 511, an answering-service memo input area 512, an FAQ browsing area 513, and an end button 514.

The customer information display area 511 is configured to display the transferred customer information. The answering-service memo input area 512 is configured to receive an input of the answering-service memo. The FAQ browsing area 513 includes display components for browsing (or searching for) FAQ information. That is, the FAQ browsing area 513 includes a keyword input area 515, and a browsing button 516. The keyword input area 515 is configured to receive an input of the keyword search in association with the FAQ information. the browsing button 516 is configured to receive an instruction to execute the keyword search.

The end button 514 is configured to be pressed when the operator ends the answering-service.

For example, the responsible operator inputs a keyword associated with the query in the keyword input area 515, and presses the browsing button 516. The information search request part 23 of the operator terminal 20 transmits an FAQ information search request (browsing request) based on the input keyword in response to the pressing of the browsing button 516. In addition, the responsible operator inputs an answering-service memo in the answering-service memo input area 512 while or after providing the answering-service. For example, the content of the query, the content of the response (answer to the query), browse-located information and the like are input as the answering-service memo. When the responsible operator presses the end button at the end of the answering-service, the answering-service memo transmitter 24 of the operator terminal 20 transmits a register request of the answering-service memo (also called "answering-service memo register request") input in the answering-service memo input area 512 to the operator management apparatus 10. Note that the call ID corresponding to the call connected to the operator terminal 20 of the responsible operator is specified for the FAQ information search request or the answering-service memo register request.

Figure 17:
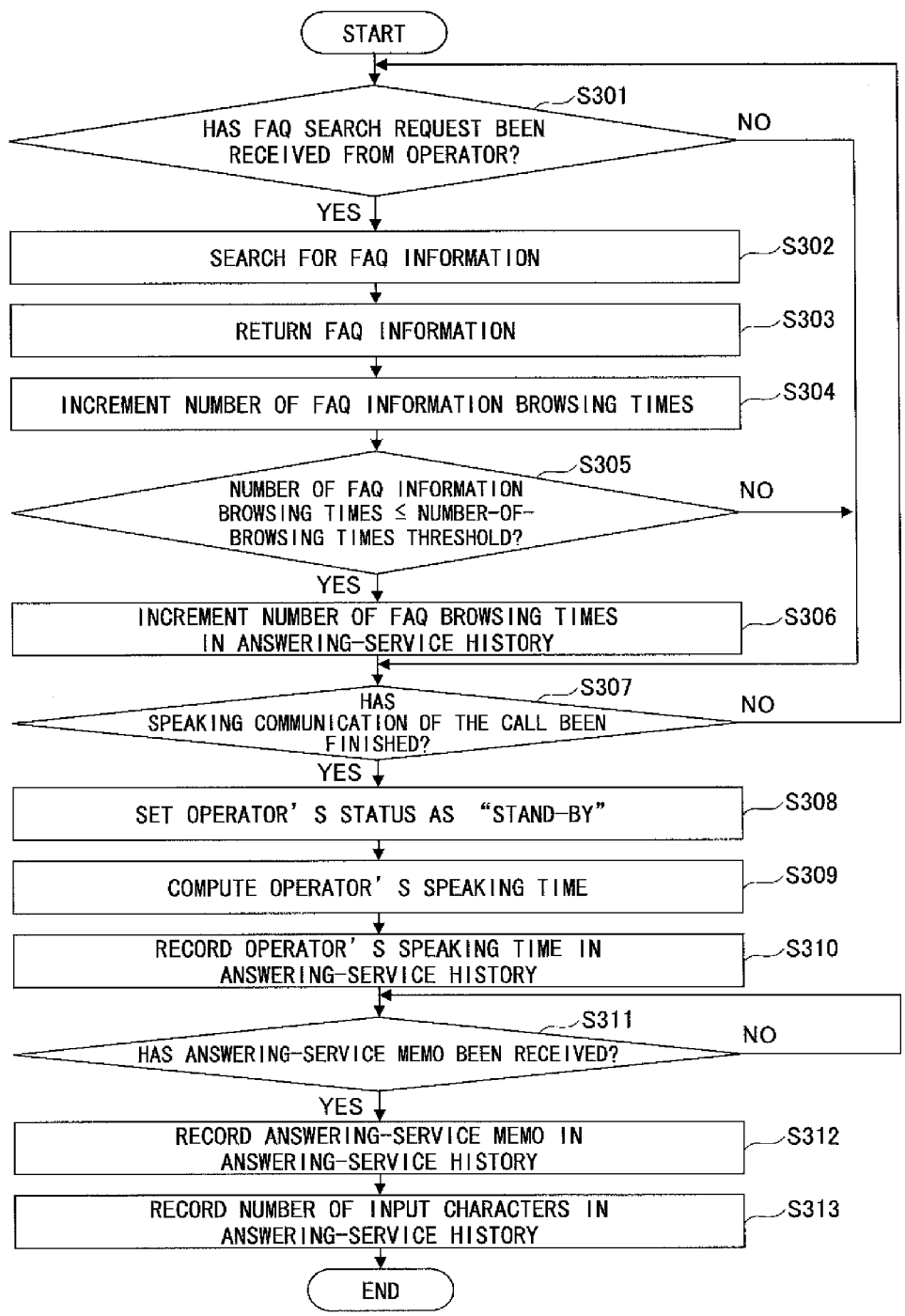
FIG. 17 is a flowchart illustrating an example of a sequence of processes executed by the operator management apparatus in response to manipulation of an answering-service screen.

Next, a description is given of a process executed by the operator management apparatus 10 in response to manipulation of the answering-service screen. FIG. 17 is a flowchart illustrating an example of a process executed by the operator management apparatus in response to manipulation of the answering-service screen.

When the FAQ information search request (FAQ information browsing request) is received from the operator terminal 20 ("YES" in step S301), the information search part 127 searches the FAQ information storage part 145 for the FAQ information that matches the keyword specified in the FAQ information search request.

FIG. 18 is a diagram illustrating a configuration example of the FAQ information storage part 145. As illustrated in FIG. 18, each record (i.e., each FAQ information) of the FAQ information storage part 145 includes respective items of a product category, a series, a query genre, a response, and the number of browsing times.

The product category indicates a category of a product based on its function. The series indicates a series name of the product. The query genre indicates classification of the query. The response indicates an example of a response (i.e., answer) with respect to the query. In FIG. 18, the item of the response includes information indicating the client's query or the client's encountered problem expressed as "When power is not switched on . . . ". Such information indicating the client's query or the client's encountered problem may be extracted and independently formed as the item of the query. The number of browsing times indicates the number of times the corresponding record (i.e., FAQ information) is browsed, that is, the number of times the corresponding record matching the search keyword is transmitted to one of the operator terminals 20. The FAQ information storage part 145 may be shared by plural operators. Hence, the number of browsing times corresponds to a total number of browsing times of the plural operators. As a result, FAQ information frequently browsed by each of the operators may be distinguished from FAQ information infrequently browsed by each of the operators based on the number of browsing times recorded in the item of the number of browsing times.

In the above step S302, FAQ information including a string of characters in any of the items that match the keyword is searched for.

Subsequently, the information search part 127 transmits one or more found FAQ information to the operator terminal 20 (step S303). Subsequently, the information search part 127 adds 1 to the number of browsing times stored in the FAQ information storage part 145 (step S304).

Subsequently, the information search part 127 determines whether the number of browsing times stored in the FAQ information storage part 145 in association with the FAQ information is less than or equal to the number-of-browsing times threshold stored in the number-of-browsing times threshold storage part 146 (step S305).

FIG. 19 is a diagram illustrating a configuration example of the number-of-browsing times threshold storage part 146. As illustrated in FIG. 19, the number-of-browsing times threshold storage part 146 includes the number-of-browsing times threshold. FIG. 19 illustrates an example of the number-of-browsing times threshold being set as "30". Note that the meaning of the number-of-browsing times threshold will be described later.

When each of the found FAQ information includes the FAQ information having the number of browsing times being less than or equal to the number-of-browsing times threshold ("YES" in step S305), the information search part 127 updates the value of the number of browsing times of the record in the answering-service history storage part 149 corresponding to the call ID specified in the search request (step S306). That is, 1 is added to the number of FAQ browsing times in association with the responsible operator.

On the other hand, when each of the found FAQ information does not include the FAQ information having the number of browsing times being less than or equal to the number-of-browsing times threshold ("NO" in step S305), the number of FAQ browsing times in association with the responsible operator will not be incremented.

The technical meaning of the branch of step S305 is as follows. As will be described later, according to this embodiment, the load degrees of each of the operators is determined based on the number of FAQ browsing times in association with a corresponding one of the operators. However, the queries in association with which the less frequently browsed FAQ information is required is expected to have higher load degrees imposed on the operator compared to the queries in association with which the frequently browsed FAQ information is required. Hence, the branch of step S305 is provided for evaluating an increase in the load degrees of the responsible operator in a case where the less frequently browsed FAQ information is browsed. Note that the number-of-browsing times threshold defines the difference between the frequently browsed FAQ information and the less frequently browsed FAQ information.

Note that steps S301 to 306 are executed every time the FAQ information search request is received. Hence, the operator who frequently searches for the less frequently browsed FAQ information while serving the answering-service may have an increased number of FAQ browsing times.

Thereafter, when the communication associated with a certain call ends ("YES" in step S307), the answering-service information recording part 128 sets the value of the status of the operator information storage part 143 as "stand-by" in association with the operator of the operator terminal 20 to which the call is connected (step S308). The operator of the operator terminal 20 to which the call is connected may be specified by the operator ID recorded in the answering-service history storage part 149.

Subsequently, the answering-service information recording part 128 computes a total speaking time of the operator in the corresponding speaking communication by referring to the speaking history storage part 144 (see FIG. 14) corresponding to the call ID in association of the corresponding call (step S309). That is, a total value is computed by adding an interval between a speaking start time and speaking end time for each of the records in association with the operator of the speaking history storage part 144. Subsequently, the answering-service information recording part 128 records the computed speaking time in the item of the operator speaking time of the record in the answering-service history storage part 149 corresponding to the call ID (step S310).

Subsequently, when the answering-service memo register request is received ("YES" in step S311), the answering-service information recording part 128 records the answering-service memo in association with the register request in the item of the answering-service memo of the record in the answering-service history storage part 149 corresponding to the call ID specified in the register request (step S312). Subsequently, the answering-service information recording part 128 counts the number of characters in the answering-service memo, and records the counted number of characters in the item of the input number of characters of the corresponding record (step S313).

Figure 20:
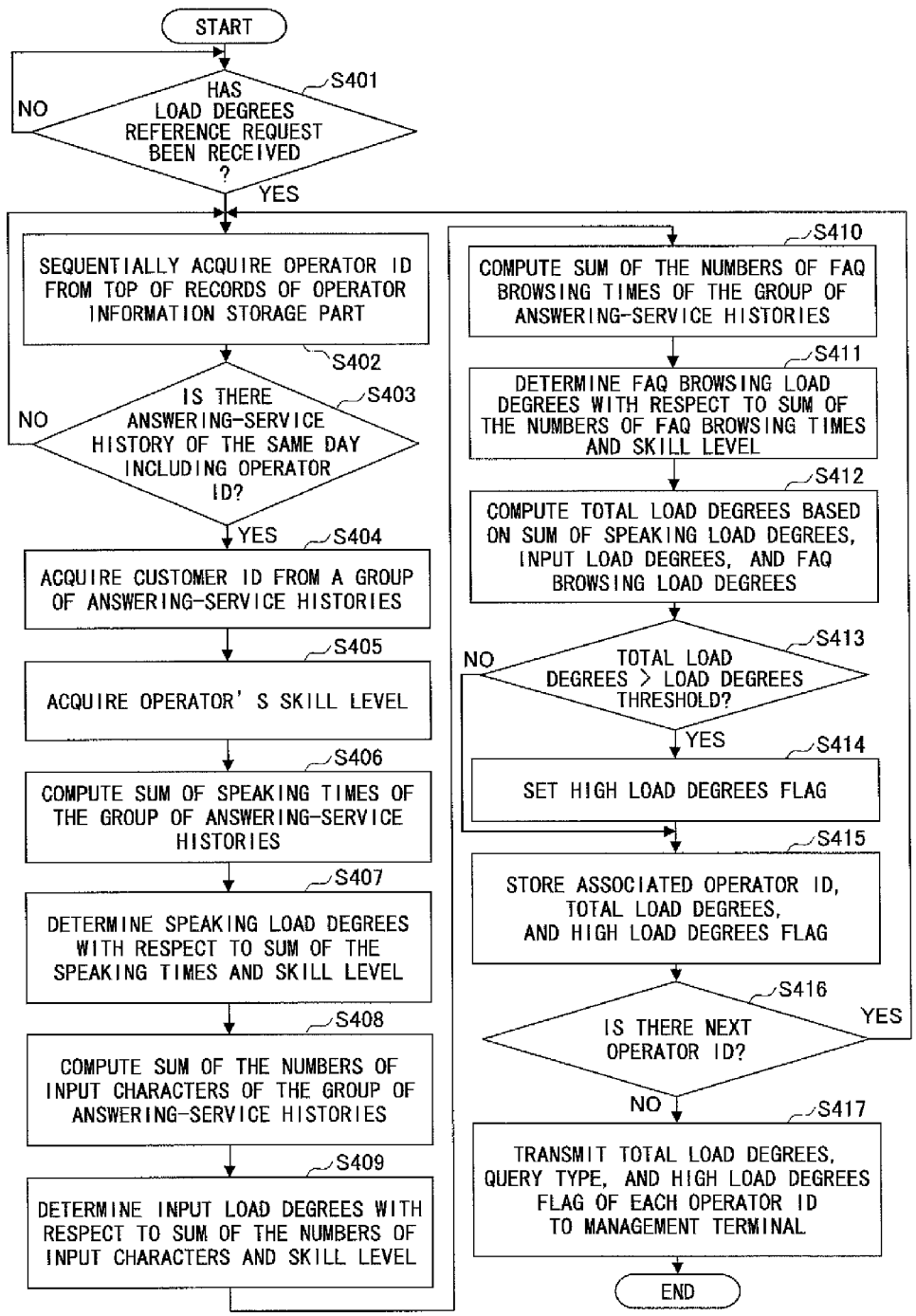
FIG. 20 is a flowchart illustrating an example of a sequence of processes executed by the operator management apparatus in response to a load degrees reference request.

Next, a description is given of a process executed by the operator management apparatus 10 on receiving a request for referring to the load degrees for each of the operators (hereinafter also called a "load degrees reference request") from the manager terminal 30. FIG. 20 is a flowchart illustrating an example of a process executed by the operator management apparatus in response to the load degrees reference request. The process illustrated in FIG. 20 is executed asynchronously with the reception of the call from the customer terminal 70 (i.e., executed asynchronously with the process illustrated in FIG. 7 or the like).

When the load degrees reference request is received from the manager terminal 30 ("YES" in step S401), the load degrees determining part 129 sequentially acquires an operator ID from the top of the records of the operator information storage part 143 (see FIG. 9) (step S402). Subsequently, the load degrees determining part 129 determines whether the record having the same operator ID, and the same received date and time as those of the acquired record is registered in the answering-service history storage part 149 (see FIG. 11) (step S403). The above "same day" refers to a date on which the process of FIG. 20 is performed. Note that step 402 is executed until a desired record is found (step S403). Specifically, steps subsequent to step S404 are performed in association with the operator who has provided the answering-service on the same date.

When one or more desired records are found ("YES" in step S403), the load degrees determining part 129 acquires the customer ID from each of the found records (hereinafter called "a group of corresponding answering-service histories") (step S404). Subsequently, the load degrees determining part 129 acquires a skill level corresponding to the operator ID in association with the group of the corresponding answering-service histories from the operator information storage part 143 (see FIG. 9) (step S405). Note that the operator associated with the operator ID is called a "target operator".

Subsequently, the load degrees determining part 129 computes the sum of the operator's speaking times of the group of the corresponding answering-service histories (step S406). Subsequently, the load degrees determining part 129 determines the speaking load degrees in association with the target operator based on the skill level and the sum of the operator's speaking times (see step S407).

FIG. 21 is a diagram illustrating a configuration example of a load degrees storage part. As illustrated in FIG. 21, the load degrees storage part 147 is configured to store load degrees (speaking load degrees, input load degrees, or FAQ browsing load degrees) based on a speaking time, the number of input characters, or the number of FAQ browsing times for every speaking task, answering-service memo input task, and FAQ browsing task. Note that the load degrees may differ based on the operators' skill levels despite the fact that the operators exhibit the identical speaking time, the identical number of input characters, and the identical number of FAQ browsing times. FIG. 21 illustrates an example of each load degrees set in accordance with one of skill levels 1, 2, and 3 or above. Note that the load degrees may be set in accordance with the further segmented skill levels when the skill level is level 3 or above.

For example, when a speaking time is 46 to 60 min, the speaking load degrees are set as 3, 2, and 1 corresponding to the skill levels 1, 2, and 3. That is, the higher the skill level the operator has, the less the speaking load degrees is set. The same settings are applied to other load degrees (i.e., input load degrees, and FAQ browsing load degrees). This is because even though the same task is performed by the same operators, the operator having a high skill level may feel subjective load degrees less than that felt by the operator having a low skill level.

In the above step S405, the load degrees determining part 129 applies a combination of the sum of the target operator's speaking times and the target operator's skill level to the load degrees storage part 147 to determine the speaking load degrees of the target operator.

Subsequently, the load degrees determining part 129 computes the sum of numbers of input characters of the group of the corresponding answering-service histories (step S408). Subsequently, the load degrees determining part 129 applies the sum of the numbers of input characters and the skill level to the load degrees storage part 147 (see FIG. 21) to determine input load degrees of the target operator (see step S409).

Subsequently, the load degrees determining part 129 computes the sum of the numbers of FAQ browsing times of the group of the corresponding answering-service histories (see step S410). Subsequently, the load degrees determining part 129 applies the sum of the numbers of FAQ browsing times and the skill level to the load degrees storage part 147 (see FIG. 21) to determine FAQ browsing load degrees of the target operator (see step S411).

Note that the number of FAQ browsing times does not necessarily match the number of times FAQ information search (browsing) is actually conducted. This is because, as illustrated in steps S305 and 306 in FIG. 17, browsing FAQ information exhibiting high browsing frequency is not counted in the number of FAQ browsing times of the operator.

Note that alternatively, the actual number of FAQ browsing times may be stored in the answering-service history storage part 149 without executing the branch of step S305 in FIG. 17 In this case, the number of FAQ browsing times is recorded for each of FAQ information items in association with each operator in the answering-service history storage part 149. Then, the number of FAQ browsing times for including in the sum may be selected in step S410. That is, the number of FAQ browsing times of the target operator recorded in the answering-service history storage part 149 may be excluded from that subject to addition in the FAQ information having the number of FAQ browsing times stored in the FAQ information storage part 145 being equal to or less than the number-of-browsing times threshold.

Subsequently, the load degrees determining part 129 computes the sum of the speaking load degrees, the input load degrees, and the FAQ browsing load degrees (step S412). The sum of the speaking load degrees, the input load degrees, and the FAQ browsing load degrees is hereinafter called "overall load degrees". Subsequently, the load degrees determining part 129 computes the overall load degrees exceeding the load degrees threshold (step S413).

Figure 22:
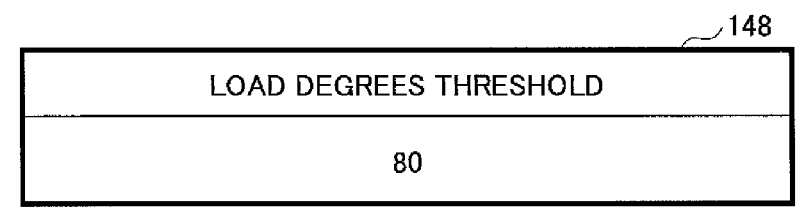

FIG. 22 is a diagram illustrating a configuration example of a load degrees threshold storage part. As illustrated in FIG. 22, the load degrees threshold storage part 148 is configured to store the load degrees threshold. The load degrees threshold differentiates high load degrees from low load degrees. FIG. 22 illustrates an example of the load degrees threshold being set as "80".

When the overall load degrees exceed the load degrees threshold, the load degrees determining part 129 associates the high load degrees flag with the operator ID of the target operator (step S414). The high load degrees flag is flag information indicating the high load degrees. Subsequently, the load degrees determining part 129 associates the overall load degrees, the query type, and the high load degrees flag with the operator ID of the target operator to store the associated overall load degrees, the query type, and the high load degrees flag in the memory unit 103 (step S415). Note that the query type is acquired from the operator information storage part 143 based on the operator ID of the target operator. Subsequently, the load degrees determining part 129 executes all the steps subsequent to step S402 on all the records excluding the records associated with the target operator stored in the operator information storage part 143 (step S416). As a result, the overall load degrees, the query type, and the high load degrees flag are associated with the operator ID of each of the operators who provide the answering-service on the same day. However, the high load degrees flag is only associated with the operator IDs of the operators whose overall load degrees exceed the load degrees threshold.

Subsequently, the load degrees output part 130 outputs (transmits) the overall load degrees, the query type, and the high load degrees flag associated with the operator ID of each of the operators to the manager terminal 30 (step S417).

Figure 23:
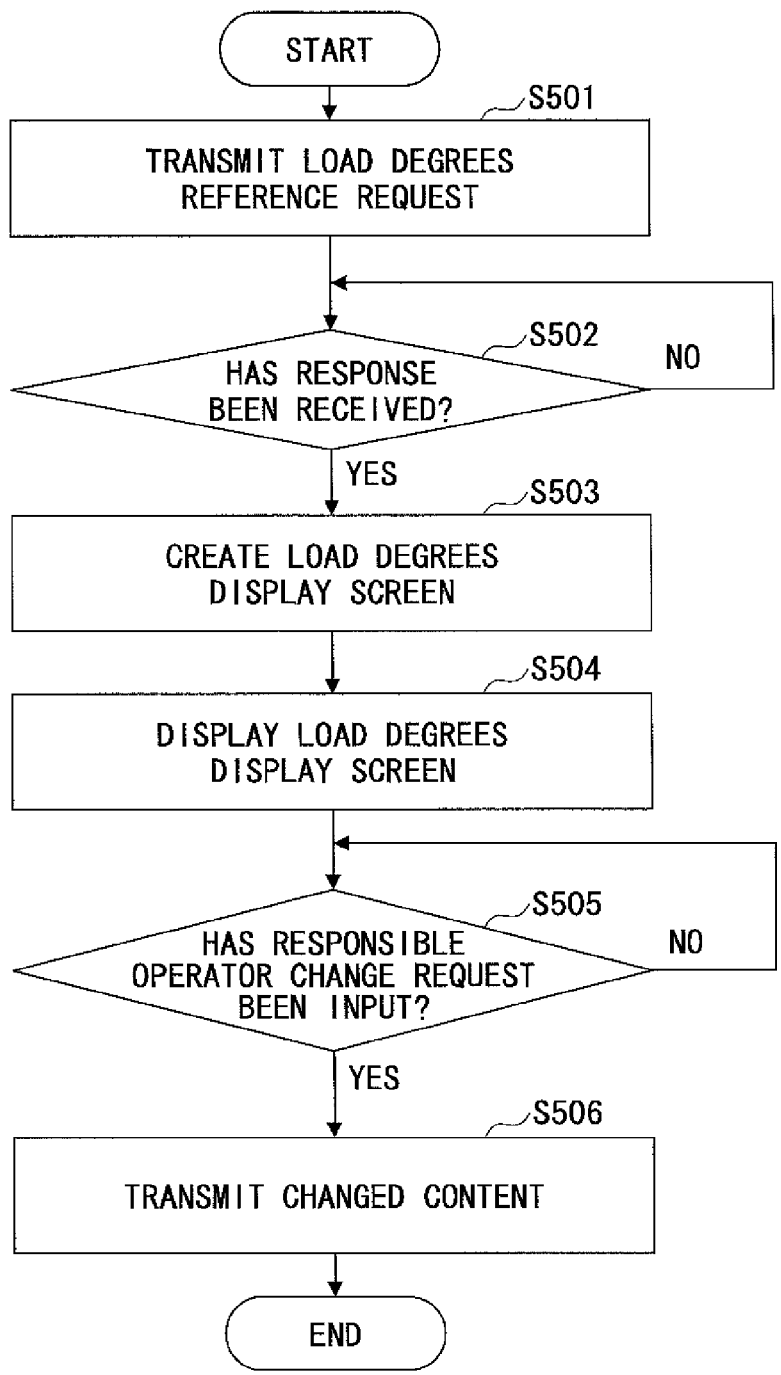
FIG. 23 is a flowchart illustrating an example of an operator's load degrees display process.

Subsequently, a description will be given below of a process executed by the management terminal 30 that is paired with the process of FIG. 20. FIG. 23 is a flowchart illustrating an example of an operator's load degrees display process.

When a manager inputs a load degrees display instruction into the manager terminal 30, the load degrees acquisition part 32 transmits a load degrees reference request to the operator management apparatus 10 (step S501). The operator management apparatus 10 executes the process of FIG. 20 illustrated above in response to the load degrees reference request to return a response including the overall load degrees, the query type, and the high load degrees flag or the like for each of the operator IDs.

When the response is received by the load degrees acquisition part 32 ("YES" in step S502), the load degrees display screen generator 33 generates the load degrees display screen based on the information included in the response (step S503). Subsequently, the input-output controller 31 causes the management terminal 30 to display the generated load degrees display screen (step S504).

Figure 24:
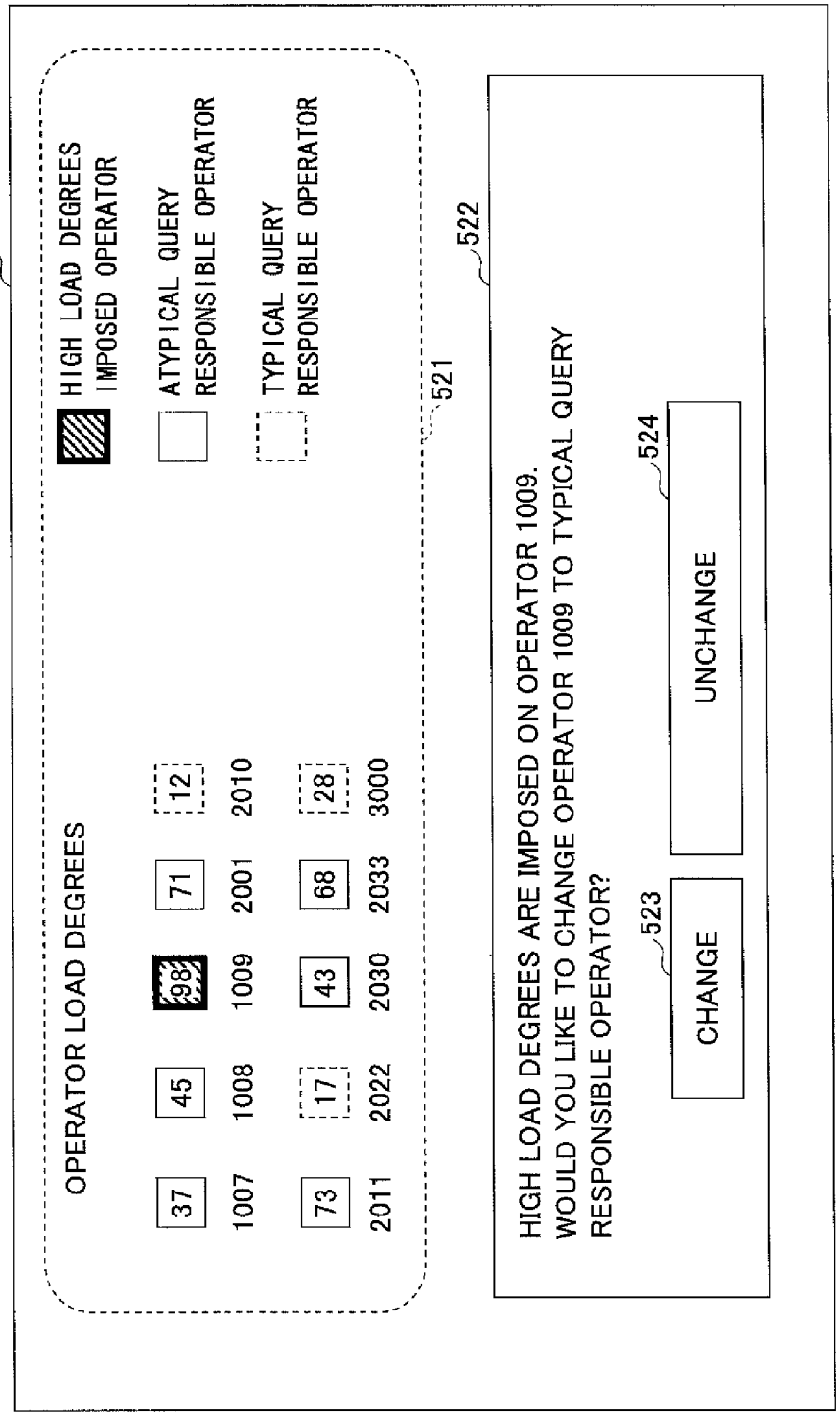
FIG. 24 is a diagram illustrating a display example of a load degrees display screen.

FIG. 24 is a diagram illustrating a display example of the load degrees display screen. As illustrated in FIG. 24, a load degrees display screen 520 includes a load degrees display area 521 and an instruction receiving area 522.

The load degrees display area 521 displays rectangles, each indicating the query type and the load degrees for a corresponding one of the operator IDs included in the information of the response returned from the manager terminal 30. That is, a solid line rectangle indicates that the operator is currently in charge of the "atypical" query. Likewise, a broken line rectangle indicates that the operator is currently in charge of the "typical" query. Further, a shaded rectangle indicates that the operator is currently in charge of the query associated with the high load degrees; that is, the operator has the high load degrees (the operator associated with the high load degrees flag). Note that a numeral inside each of the rectangles indicates overall load degrees. Further, a numeral beneath each of the rectangles indicates an operator ID.

The manager may be able to check the query type currently in charge and the overall load degrees of each of the operators at one view by referring to the load degrees display area 521.

The instruction receiving area 522 is configured to receive an instruction to change the responsible operator corresponding to each of the query types. FIG. 24 illustrates a message indicating whether to change the responsible operator having the lowest overall load degrees and in charge of the "typical" query with the responsible operator having the operator ID associated with the high load degrees flag and in charge of the "atypical" query. Note that change of the responsible operator with respect to the query type is not necessarily carried out between the operators. For example, the query type, of which the responsible operator exhibiting relatively high overall load degrees is in charge, may be changed instead of changing the responsible operator. Further, the load degrees display area 521 will not have to automatically display candidates to be replaced as the responsible operator. For example, the manager may change the query type, of which the responsible operator is in charge, by selecting one of the rectangles associated with the responsible operator in the load degrees display area 521.

In the example of FIG. 24, when the manager determines that it is not necessary to change the responsible operator, the manager presses a button 524. In this case, the load degrees display screen 520 is undisplayed. On the other hand, when the manager determines that it is necessary to change the responsible operator, the manager presses a button 523. In response to the depression of the button 523, the responsible operator change request part 34 of the manager terminal 30 specifies the content to be changed indicated in the instruction receiving area 522 to transmit a responsible operator change request to the operator management apparatus 10. That is, the responsible operator change request including the query type of the operator 1009 to be changed to "typical" and the query of the operator 2010 to be changed to "atypical" is transmitted to the operator management apparatus 10.

Figure 25:
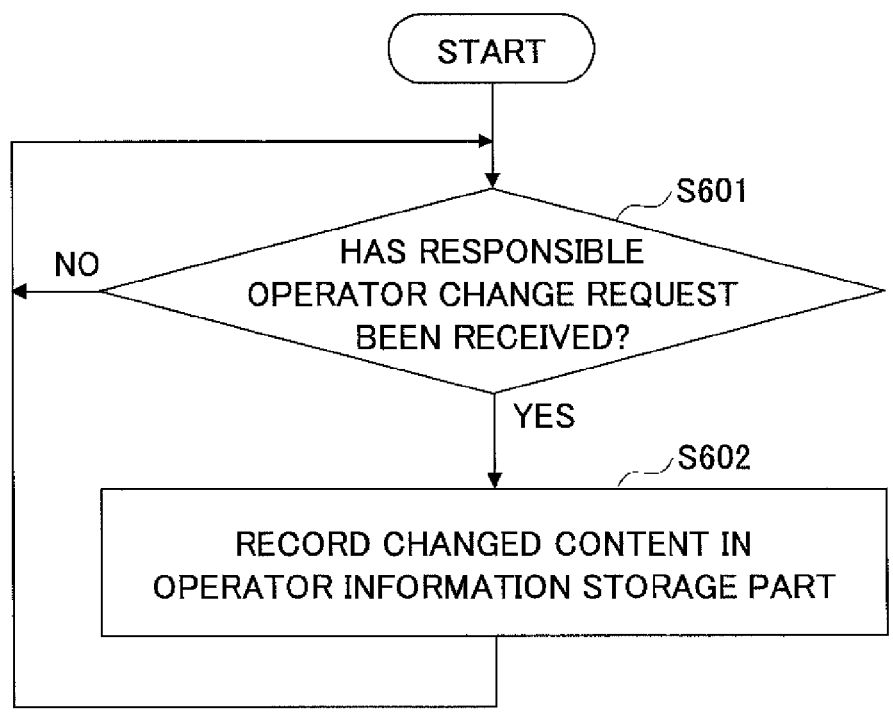
FIG. 25 is a flowchart illustrating an example of a responsible operator changing process.

Next, a description is given of a process executed by the operator management apparatus 10 in response to the responsible operator change request. FIG. 25 is a flowchart illustrating an example of a responsible operator changing process.

When the responsible operator change part 131 of the operator management apparatus 10 receives the responsible operator change request ("YES" in step S601), the responsible operator change part 131 executes a process in accordance with the content to be changed as specified in the responsible operator change request (step S602). Specifically, the responsible operator change part 131 updates a value of the query type in the operator information storage part 143 associated with the operator ID specified in the content to be changed with a query type specified in the content to be changed. In the example of FIG. 24, when the query type of the operator 1009 is updated with the "typical", and the query type of the operator 2010 is updated with "atypical". As a result, the "typical" query is allocated to the operator 1009 whereas the "atypical" query is allocated to the operator 2010. Accordingly, the load degrees may be equalized between the operators.

As described above, according to the embodiment, it may be possible to evaluate the operator's load degrees (the overall load degrees) not only including the speaking time (speaking duration) but including the number of FAQ information browsing times and the number of input characters of the answering-service memo. It may be possible to construe that FAQ information being browsed numerous times indicates that there are numerous queries that the operators are not able to answer according to the their knowledge alone. Further, when the content of the query is complicated or is wide ranging, it is expected that the number of input characters will be increased. This is because the number of input characters to explain the content of the query is increased, and the number of input characters to explain a content of a task to provide the answering-service for this particular query is also increased. Accordingly, the answering-service that needs to browse FAQ information numerous times or that needs to input numerous characters in the answering-service memo may be considered as the answering-service that imposes high subjective (or psychological) load degrees on the operators. Hence, according to the above embodiment, it may be possible for the manager to realize the subjective load degrees of each of the operators.

In addition, according to the above embodiment, even though the operators have the same objective workload and same load degrees such as the speaking time (speaking duration), the number of characters input in the answering-service memo, or the number of FAQ information browsing times, the subjective load degrees imposed on the operators may be evaluated differently in accordance with their skill levels. That is, even though the operators have the same workload, the load degrees that the individual operators feel may differ according to his/her individual experience and capability. Hence, according to the above embodiment, it may be possible for the manager to evaluate the subjective load degrees of each of the operators including the above-described considerations.

In addition, according to the above embodiment, it may be considered that relatively less frequently browsed FAQ information imposes load degrees higher than relatively frequently browsed FAQ information on the operators. The FAQ information being frequently browsed by the operators may be highly recognized by the operators, and hence, it may be considered that such frequently browsed FAQ information may be easily found. Accordingly, it may be considered that the operators subjective load degrees to browse such frequently browsed FAQ information is relatively low. On the other hand, the FAQ information being less frequently browsed by the operators may be scarcely recognized by the operators, and hence, it may be considered that searching for such less frequently browsed FAQ information may relatively be difficult. Accordingly, it may be considered that the operators subjective load degrees to browse such less frequently browsed FAQ information is relatively high. Hence, according to the above embodiment, it may be possible for the manager to evaluate the subjective load degrees of each of the operators including the above-described considerations.

Note that information subject to browsing (or search target) while providing the answering-service is not limited to the FAQ information. For example, electronic manuals for manufactured products or commercial products may be subject to browsing. In this case, the number of electronic manuals browsing times may be counted and load degrees may be determined based on the counted number of electronic manuals browsing times.

Further, the load degrees may be determined based on any one of the number of FAQ browsing times and the number of characters input into the answering-service memo. However, the validity in evaluating the load degrees may be improved by determining the load degrees based on both the number of FAQ browsing times and the number of characters input into the answering-service memo.

Note that the answering-service history storage part 149 is an example of a browsing times history storage unit and a generated data storage unit. The load degrees determining part 129 is an example of a determining unit. The load degrees output part 130 is an example of an output unit. The operator information storage part 143 is an example of a capability storage unit. The FAQ information storage part 145 is an example of a frequency storage unit. The information search part 127 is an example of an updating unit.

According to the above-described embodiment, it may be possible to assist in the recognition of the load degrees imposed on each of the operators in the call center.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An operator management apparatus, comprising:
   a browsing times history storage unit configured to record a number of transmission times browsing information relating to a customer service is transmitted to an operator terminal used by an operator in association with an identifier of the operator that serves customers, for each of a plurality of operators;
   a load degrees storage unit configured to store load degrees of an operator in association with a number of transmission times of browsing information;
   a determining unit configured to specify a number of transmission times corresponding to a specific one of the identifies of the operators by referring to the browsing times history storage unit, and specify load degrees corresponding to the specified number of transmission times by referring to the load degrees storage unit; and
   an output unit configured to output the specified load degrees.

2. The operator management apparatus as claimed in claim 1, further comprising:
   a generated data storage unit configured to store data generated by the operator and transmitted by the operator terminal in association with the identifier of the operator, wherein
   the load degrees storage unit is configured to store the load degrees of an operator in association with an amount of the data generated by the operator, and
   the determining unit is configured to specify an amount of data generated by a specific one of the operators by referring to the generated data storage unit and specify load degrees corresponding to the specified amount of data by referring to the load degrees storage unit.

3. The operator management apparatus as claimed in claim 1, further comprising:
   a capability storage unit configured to store a capability level of an operator in association with an identifier of the operator, for each of operators, wherein
   the load degrees storage unit is configured to store load degrees based on the number of transmission times and the capability level of an operator, and
   the determining unit is configured to specify a capability level of the specific one of the operators by referring to the capability storage unit, and specify load degrees corresponding to the specified number of transmission times and the specified capability level by referring to the load degrees storage unit.

4. The operator management apparatus as claimed in claim 2, further comprising:
   a capability storage unit configured to store a capability level of an operator in association with an identifier of the operator, for each of operators, wherein
   the load degrees storage unit is configured to store load degrees based on the amount of the data and the capability level of an operator, and
   the determining unit is configured to specify a capability level of the specific one of the operators by referring to the capability storage unit, and specify load degrees corresponding to the specified amount of the data and the specified capability level by referring to the load degrees storage unit.

5. The operator management apparatus as claimed in claim 1, further comprising:
   a frequency storage unit configured to store the number of transmission times in association with an identifier of browsing information, for each of the browsing information, the identifier of the browsing information identifying the browsing information; and
   an updating unit configured to specify one of the browsing information having a number of transmission times not exceeding a predetermined threshold by referring to the frequency storage unit and store the number of transmission times transmitted to the operator terminal in association with the specified one of the browsing information in the browsing times history storage unit.

6. An operator management method performed by a computer for analyzing work performance of respective operators serving customers, the operator management method comprising:
   referring, by the computer, to a browsing times history storage unit recording a number of transmission times browsing information relating to a customer service is transmitted to an operator terminal used by an operator in association with an identifier of the operator that serves customers, for each of a plurality of operators, to specify a number of transmission times the browsing information is transmitted corresponding to a specific one of the identifies of the operators;
   referring to a load degrees storage unit storing load degrees of an operator in association with a number of transmission times of browsing information to determine load degrees corresponding to the specified number of transmission times; and
   outputting the specified load degrees.

7. The operator management method as claimed in claim 6, further comprising:
   referring, by the computer, to a generated data storage unit storing data generated by the operator and transmitted by the operator terminal in association with the identifier of the operator to specify an amount of data corresponding to a specific one of the operators; and
   referring to the load degrees storage unit storing load degrees in association with an amount of data generated by the operator to determine load degrees corresponding to the specified amount of data.

8. The operator management method as claimed in claim 6, further comprising:
   referring, by the computer, to a capability storage unit storing a capability level of an operator in association with an identifier of the operator, for each of operators, to specify a capability level of the specific one of the operators; and referring to the load degrees storage unit storing load degrees based on the number of transmission times and the capability level of an operator to determine load degrees corresponding to the number of transmission times a specified one of the browsing information is transmitted and a specified one of the capability levels.

9. The operator management method as claimed in claim 7, further comprising:

referring, by the computer, to a capability storage unit storing a capability level of an operator in association with an identifier of the operator, for each of operators, to specify a capability level of the specific one of the operators; and referring to the load degrees storage unit storing an amount of the generated data and the load degrees based on the capability level to determine load degrees corresponding to the specified amount of the data and the specified capability level.

10. The operator management method as claimed in claim 6, further comprising:

referring, by the computer, to a frequency storage unit storing a number of transmission times in association with browsing information, for each of the browsing information, to specify one of the browsing information having a number of transmission times not exceeding a predetermined threshold, the identifier of the browsing information identifying the browsing information; and storing the number of transmission times transmitted to the operator terminal in association with the specified one of the browsing information in the browsing times history storage unit.

11. A non-transitory computer-readable recording medium storing an operator management program, which when processed by a computer, causes the computer to execute an analysis process of work performance of operators serving respective customers, the analysis process comprising:

referring, by the computer, to a browsing times history storage unit recording a number of transmission times browsing information relating to a customer service is transmitted to an operator terminal used by an operator in association with an identifier of the operator that serves customers, for each of a plurality of operators, to specify a number of transmission times the browsing information is transmitted corresponding to a specific one of the identifies of the operators;

referring to a load degrees storage unit storing load degrees of an operator in association with a number of transmission times of browsing information to determine load degrees corresponding to the specified number of transmission times; and outputting the specified load degrees.

12. The non-transitory computer-readable recording medium as claimed in claim 11, the analysis process further comprising:

referring, by the computer, to a generated data storage unit storing data generated by the operator and transmitted by the operator terminal in association with the identifier of the operator to specify an amount of data corresponding to a specific one of the operators; and referring to the load degrees storage unit storing load degrees in association with an amount of data generated by the operator to determine load degrees corresponding to the specified amount of data.

13. The non-transitory computer-readable recording medium as claimed in claim 11, the analysis process further comprising:

referring, by the computer, to a capability storage unit storing a capability level of an operator in association with an identifier of the operator, for each of operators, to specify a capability level of the specific one of the operators; and referring to the load degrees storage unit storing load degrees based on the number of transmission times and the capability level of an operator to determine load degrees corresponding to the number of transmission times a specified one of the browsing information is transmitted and a specified one of the capability levels.

14. The non-transitory computer-readable recording medium as claimed in claim 12, the analysis process further comprising:

referring, by the computer, to a capability storage unit storing a capability level of an operator in association with an identifier of the operator, for each of operators, to specify a capability level of the specific one of the operators; and referring to the load degrees storage unit storing an amount of the generated data and the load degrees based on the capability level to determine load degrees corresponding to the specified amount of the data and the specified capability level.

15. The non-transitory computer-readable recording medium as claimed in claim 11, the analysis process, further comprising:

referring, by the computer, to a frequency storage unit storing a number of transmission times in association with browsing information, for each of the browsing information, to specify one of the browsing information having a number of transmission times not exceeding a predetermined threshold, the identifier of the browsing information identifying the browsing information; and storing the number of transmission times transmitted to the operator terminal in association with the specified one of the browsing information in the browsing times history storage unit.

* * * * *